(12) United States Patent
Morita et al.

(10) Patent No.: US 7,890,606 B2
(45) Date of Patent: Feb. 15, 2011

(54) INFORMATION PROCESSING APPARATUS AND METHOD, AND PROGRAM

(75) Inventors: Toshihiro Morita, Kanagawa (JP); Shin Ogata, Tokyo (JP); Susumu Morita, Saitama (JP)

(73) Assignee: Sony Corporation, Tokyo (JP)

( * ) Notice: Subject to any disclaimer, the term of this patent is extended or adjusted under 35 U.S.C. 154(b) by 359 days.

(21) Appl. No.: 11/776,745

(22) Filed: Jul. 12, 2007

(65) Prior Publication Data

US 2008/0052380 A1 Feb. 28, 2008

(30) Foreign Application Priority Data

Aug. 24, 2006 (JP) ............................. 2006-227868

(51) Int. Cl.
*G06F 15/16* (2006.01)

(52) U.S. Cl. ....................... 709/219; 709/217; 709/223; 709/211; 709/212; 707/201; 705/1; 705/51

(58) Field of Classification Search .................. 709/219
See application file for complete search history.

(56) References Cited

U.S. PATENT DOCUMENTS

| | | | |
|---|---|---|---|
| 2004/0133448 A1* | 7/2004 | Higashi et al. | 705/1 |
| 2005/0021470 A1* | 1/2005 | Martin et al. | 705/51 |
| 2005/0165898 A1* | 7/2005 | Morita et al. | 709/211 |
| 2005/0219963 A1* | 10/2005 | Fujisawa | 369/30.05 |
| 2007/0061497 A1* | 3/2007 | Takatsuka | 711/100 |
| 2007/0156779 A1* | 7/2007 | Ho et al. | 707/201 |
| 2007/0198632 A1* | 8/2007 | Peart et al. | 709/203 |
| 2007/0244984 A1* | 10/2007 | Svendsen | 709/217 |
| 2007/0244986 A1* | 10/2007 | Svendsen | 709/217 |
| 2008/0059601 A1* | 3/2008 | Yoshikawa | 709/212 |
| 2008/0256378 A1* | 10/2008 | Guillorit | 713/400 |

* cited by examiner

*Primary Examiner*—Firmin Backer
*Assistant Examiner*—Natisha Cox
(74) *Attorney, Agent, or Firm*—Oblon, Spivak, McClelland, Maier & Neustadt, L.L.P.

(57) ABSTRACT

Disclosed herein is an information processing apparatus that transmits information to a server, the apparatus including: connection determination means for determining whether a portable terminal has been connected to the information processing apparatus; information acquisition means for, when the connection determination means determines that the terminal has been connected to the information processing apparatus, acquiring, from the terminal, identification information of the terminal and operation information concerning playing of a content played by the terminal; and transmission means for transmitting, to the server, play history information of the terminal together with the identification information of the terminal, the play history information of the terminal being composed of the operation information acquired by the information acquisition means.

12 Claims, 20 Drawing Sheets

FIG. 5

| Event ID | Content ID | Time Stamp |
|---|---|---|
| 1 | 010F500000040000007 | 2006-07-25 11:30:10 |
| 2 | 010F500000040000007 | 2006-07-25 11:35:01 |
| 1 | 010F50000004000001B | 2006-07-25 11:35:02 |
| 2 | 010F50000004000001B | 2006-07-25 11:38:20 |

101

FIG. 9
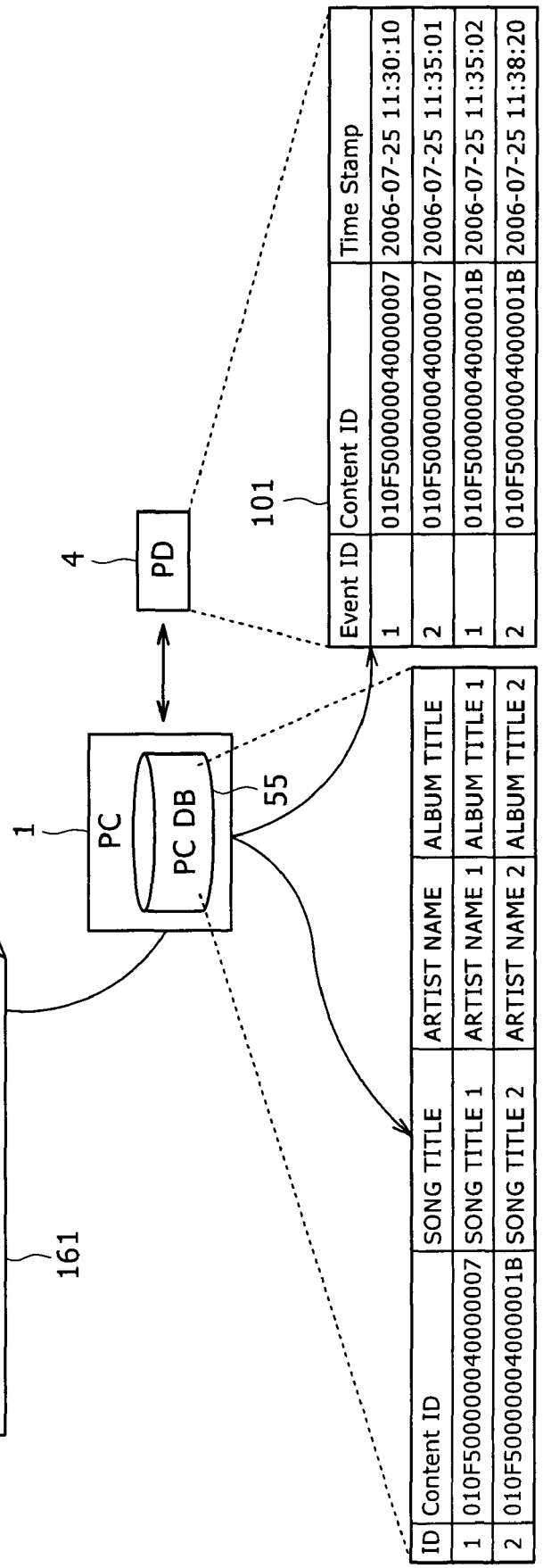
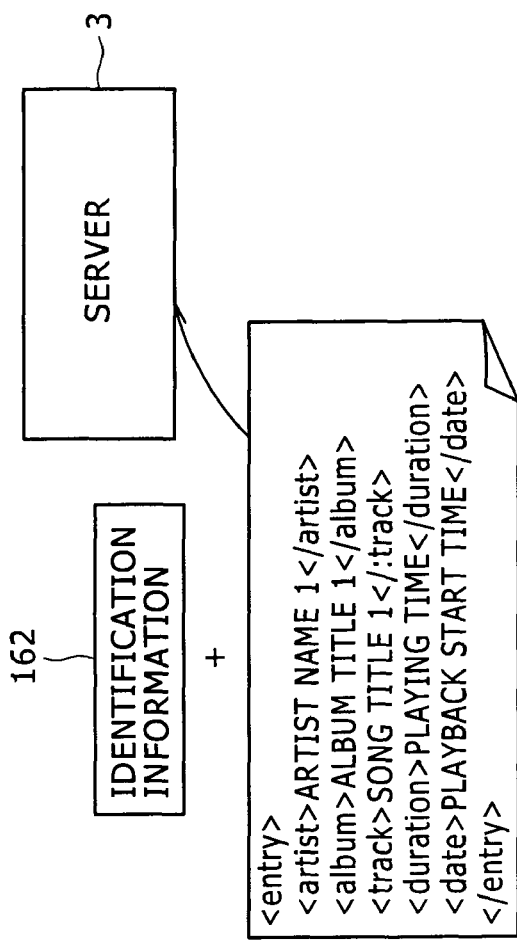

FIG.15

| Sonic Stage |
|---|

You need to log in to Music Community for providing notification of play history E-mail address(M): [        ]

Password(P): [        ]

[New Registration(N)]   [ OK ]   [ Cancel ]

```
<?xml version="1.0" encoding="UTF-8"?>

<entries>
<entry xmlns="http://purl.org/atom/ns#" xmlns:otolog="http://otolog.org/ns/music#">
<otolog:artist>Artist Name 1</otolog:artist>
<otolog:album>Album Title 1</otolog:album>
<otolog:track>Song Title 1</otolog:track>
<otolog:duration>Length of Playing Time(sec)</otolog:duration>
<otolog:date>Playback Start Time(YYYY-MM-DD hh:mm:ss)</otolog:date>
</entry>
</entries>
```

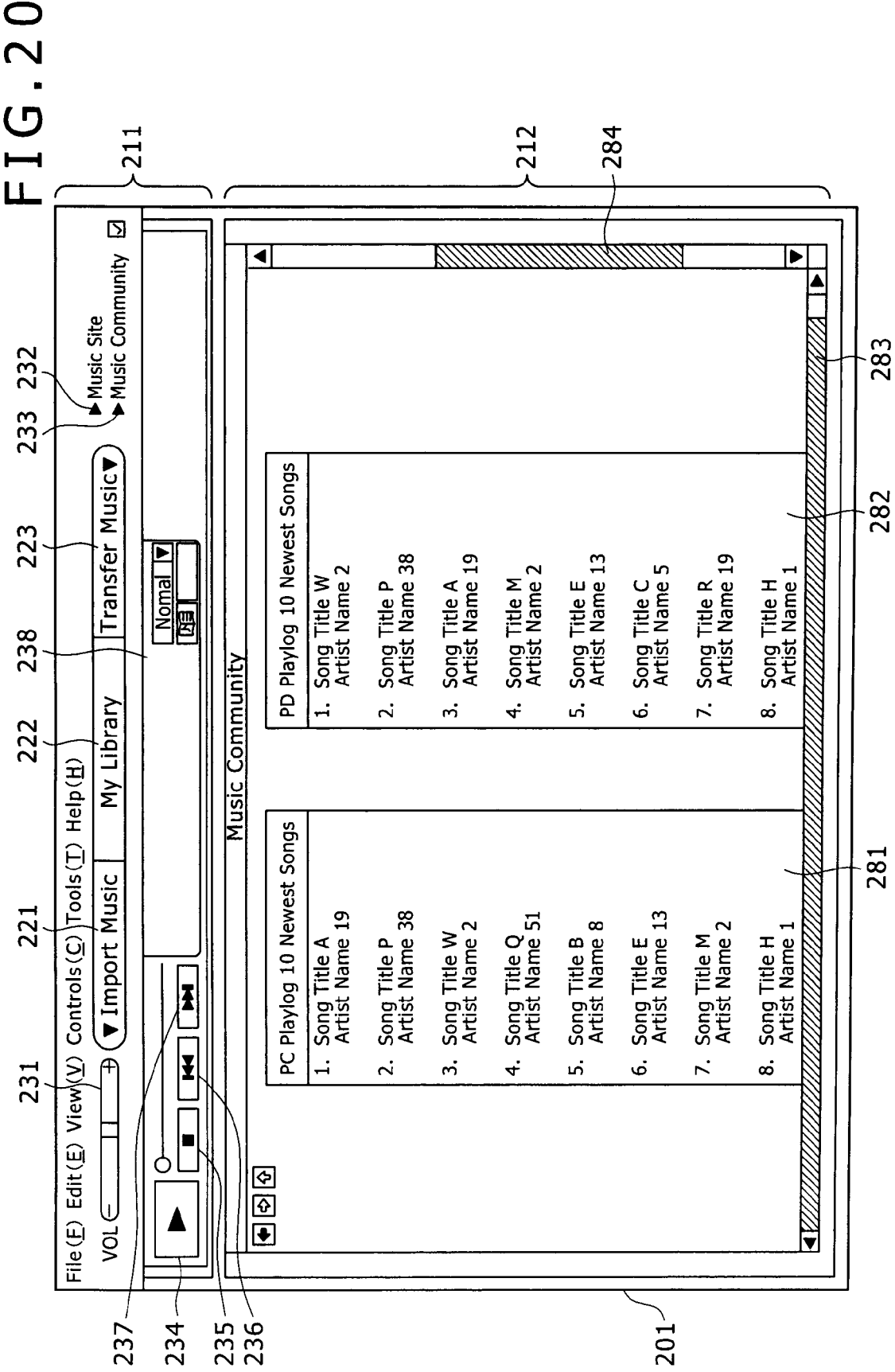

7,890,606 B2

INFORMATION PROCESSING APPARATUS AND METHOD, AND PROGRAM

CROSS REFERENCES TO RELATED APPLICATIONS

The present invention contains subject matter related to Japanese Patent Application JP 2006-227868, filed in the Japan Patent Office on Aug. 24, 2006, the entire contents of which being incorporated herein by reference.

BACKGROUND OF THE INVENTION

1. Field of the Invention

The present invention relates to an information processing apparatus and method, and a program therefor. In particular, the present invention relates to an information processing apparatus and method, and a program therefor which make it possible to transmit to a server not only a play history of contents in a PC but also a play history of contents in a portable playback terminal.

2. Description of the Related Art

Recent years have seen an increasing use of a method of importing music data into a jukebox application on a personal computer (PC) by ripping music recorded on a compact disc (CD) or by using a music distribution service or the like to download desired music from a music distribution server. Users play a content such as the music data imported into the jukebox application on the PC or transfer the content to a portable device (PD) and play the content therewith for their enjoyment.

In addition, a Web service is already in use that allows the users to upload their play histories of contents played with the jukebox application on the PC to a server so that the play histories of the contents can be shared by the users (see, for example, "PLAYLOG", [online], Label Gate Co., Ltd., [searched on Aug. 14, 2006], Internet <http://playlog.jp/>).

SUMMARY OF THE INVENTION

Unfortunately, however, the play histories that can be uploaded at the present time are only the play histories of the contents played with the jukebox application on the PC. As such, there is a demand for an increased variety of sources from which the play histories can be acquired so that a greater amount of data can be accumulated in the Web service.

The present invention has been devised in view of the above situation, and makes it possible to transmit to the server a play history of contents in a portable playback terminal, in addition to the play history of the contents in the PC.

According to one embodiment of the present invention, there is provided an information processing apparatus that transmits information to a server, the apparatus including: connection determination means for determining whether a portable terminal has been connected to the information processing apparatus; information acquisition means for, when the connection determination means determines that the terminal has been connected to the information processing apparatus, acquiring, from the terminal, identification information of the terminal and operation information concerning playing of a content played by the terminal; and transmission means for transmitting, to the server, play history information of the terminal together with the identification information of the terminal, the play history information of the terminal being composed of the operation information acquired by the information acquisition means.

The information processing apparatus may further include: storage means for storing metadata of a content; metadata determination means for determining whether metadata of the content played by the terminal is stored in the storage means; metadata acquisition means for, when the metadata determination means determines that the metadata of the content played by the terminal is stored in the storage means, acquiring the metadata of the content played by the terminal from the storage means; and play history information generation means for adding the metadata acquired by the metadata acquisition means to the operation information acquired by the information acquisition means to generate the play history information of the terminal.

It may be so arranged that, when the metadata determination means determines that the metadata of the content played by the terminal is not stored in the storage means, the information acquisition means further acquires, from the terminal, the metadata of the content played by the terminal, and the play history information generation means adds the metadata acquired by the information acquisition means to the operation information acquired by the information acquisition means to generate the play history information of the terminal.

According to one embodiment of the present invention, there is provided an information processing method employed by an information processing apparatus that transmits information to a server, the method including the steps of: determining whether a portable terminal has been connected to the information processing apparatus; when it is determined that the terminal has been connected to the information processing apparatus, acquiring, from the terminal, identification information of the terminal and operation information concerning playing of a content played by the terminal; and transmitting, to the server, play history information of the terminal together with the identification information of the terminal, the play history information of the terminal being composed of the acquired operation information.

According to one embodiment of the present invention, there is provided a program for causing a computer to execute a process including the steps of: determining whether a portable terminal has been connected; when it is determined that the terminal has been connected, acquiring, from the terminal, identification information of the terminal and operation information concerning playing of a content played by the terminal; and transmitting, to the server, play history information of the terminal together with the identification information of the terminal, the play history information of the terminal being composed of the acquired operation information.

In one embodiment of the present invention, it is determined whether a portable terminal has been connected; and when it is determined that the terminal has been connected, identification information of the terminal and operation information concerning playing of a content played by the terminal is acquired from the terminal. Then, play history information of the terminal composed of the acquired operation information is transmitted to the server together with the identification information of the terminal.

According to one embodiment of the present invention, it is possible to transmit a play history of a content in a portable playback terminal to a server. As a result, the server can accumulate an increased number of play histories.

BRIEF DESCRIPTION OF THE DRAWINGS

FIG. 5 shows an exemplary structure of an operation information table in a PD database;

FIG. 9 is a conceptual diagram illustrating generation and acquisition of play history data of a PD;

FIG. 15 shows an exemplary display of a log-in window;

FIG. 17 shows an exemplary structure of the play history data of the PD generated by a process of step S56 in FIG. 12;

FIG. 20 shows an exemplary screen in which the play history information of the PD is presented together with the play history information of the PC.

DETAILED DESCRIPTION OF THE PREFERRED EMBODIMENTS

Figure 1:
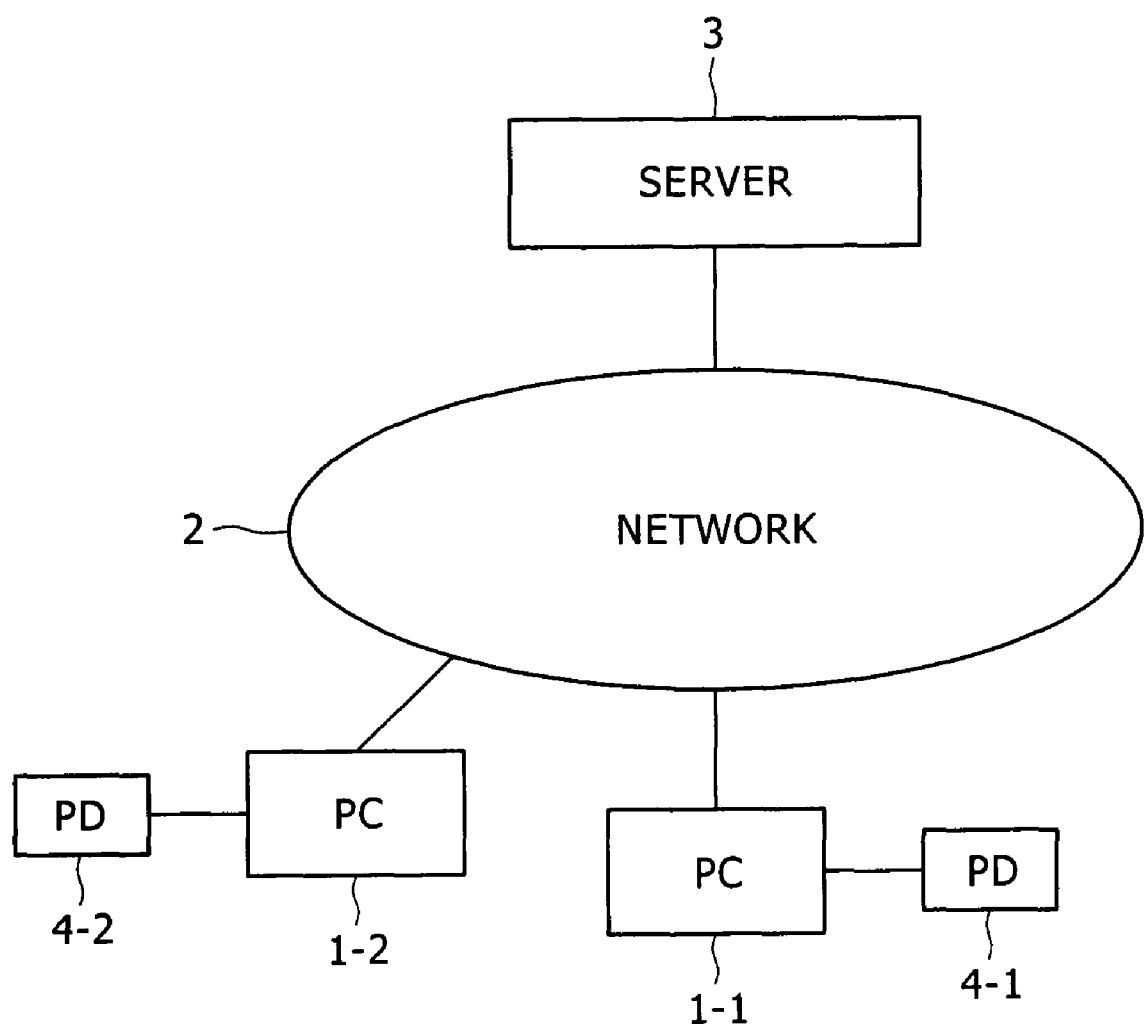
FIG. 1 shows an exemplary structure of a Web service providing system according to one embodiment of the present invention.

Hereinafter, embodiments of the present invention will be described. Correspondence between the constituent features of the present invention and the embodiments that will be described below in this specification taken in conjunction with the accompanying drawings is exemplified as follows. Note that this preliminary description is meant to confirm that an embodiment that supports the present invention is described in this specification and the accompanying drawings. Therefore, even if there is an embodiment that is described in this specification and the accompanying drawings but not described in this preliminary description as corresponding to a constituent feature of the present invention, that does not mean that that embodiment does not correspond to that constituent feature. Conversely, even if a certain embodiment is described in this preliminary description as corresponding to a certain constituent feature of the present invention, that does not mean that the certain embodiment does not correspond to any other constituent feature.

An information processing apparatus according to one embodiment of the present invention is an information processing apparatus (e.g., a PC 1-1 in FIG. 1) that transmits information to a server (e.g., a server 3 in FIG. 1), the apparatus including: connection determination means (e.g., a transfer processing section 78 in FIG. 3) for determining whether a portable terminal has been connected to the information processing apparatus; information acquisition means (e.g., a PD plug-in module 54 in FIG. 3) for, when the connection determination means determines that the terminal has been connected to the information processing apparatus, acquiring, from the terminal, identification information of the terminal and operation information concerning playing of a content played by the terminal; and transmission means (e.g., a browser 52 in FIG. 3) for transmitting, to the server, play history information of the terminal together with the identification information of the terminal, the play history information of the terminal being composed of the operation information acquired by the information acquisition means.

The information processing apparatus may further include: storage means (e.g., a PC database 55 in FIG. 3) for storing metadata of a content; metadata determination means (e.g., a content management section 77 in FIG. 3) for determining whether metadata of the content played by the terminal is stored in the storage means; metadata acquisition means (e.g., a data access module 53 in FIG. 3) for, when the metadata determination means determines that the metadata of the content played by the terminal is stored in the storage means, acquiring the metadata of the content played by the terminal from the storage means; and play history information generation means (e.g., a play history data generation section 76 in FIG. 3) for adding the metadata acquired by the metadata acquisition means to the operation information acquired by the information acquisition means to generate the play history information of the terminal.

Figure 12:
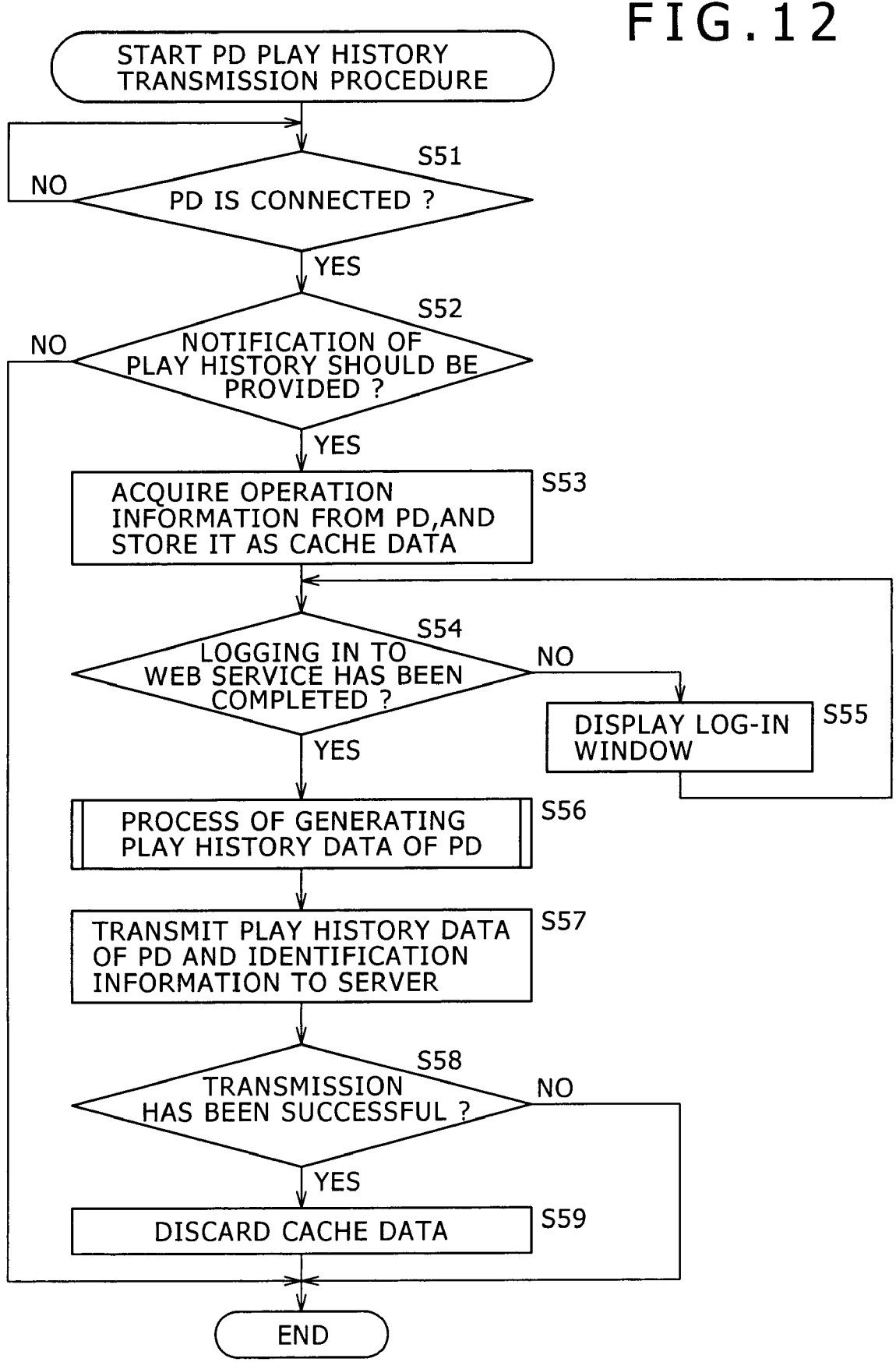
FIG. 12 is a flowchart illustrating a PD play history transmission procedure performed by the PC.

An information processing method or a program according to one embodiment of the present invention is an information processing method employed by an information processing apparatus that transmits information to a server or a program for causing a computer to execute a process, the method or the process including the steps of: determining whether a portable terminal has been connected (e.g., step S51 in FIG. 12); when it is determined that the terminal has been connected, acquiring, from the terminal, identification information of the terminal and operation information concerning playing of a content played by the terminal (e.g., step S53 in FIG. 12); and transmitting, to the server, play history information of the terminal together with the identification information of the terminal, the play history information of the terminal being composed of the acquired operation information (e.g., step S57 in FIG. 12).

Hereinafter, an embodiment of the present invention will be described with reference to the accompanying drawings.

FIG. 1 shows an exemplary structure of a Web service providing system according to one embodiment of the present invention.

Personal computers (PCs) 1-1 and 1-2 are connected to a network 2 typified by the Internet. Hereinafter, the PCs 1-1 and 1-2 will be referred to simply as "PC 1" unless they have to be differentiated from each other. Although the number of PCs 1 shown in FIG. 1 is two, any number of PCs may be connected to the network 2.

In addition, a server 3 for providing a predetermined Web service is connected to the network 2. Any number of servers 3 may be connected to the network 2.

Moreover, portable devices (PDs) 4-1 and 4-2, which are portable recording/playback terminals, are connected to the PCs 1-1 and 1-2, respectively, in a detachable manner via a Universal Serial Bus (USB) cable or the like. Hereinafter, the PDs 4-1 and 4-2 will be referred to simply as "PD 4" as appropriate unless they have to be differentiated from each other.

The server 3 has a play history database 115 (see FIG. 7, which will be described later) that stores play history information (hereinafter also referred to as "play history information of the PC 1") concerning a content played with the PC 1, and play history information (hereinafter also referred to as "play history information of the PD 4") concerning a content played with the PD 4. The server 3 manages the play history information of the PC 1 and the play history information of the PD 4 in a unified manner, and provides, to a user of the PC 1, a Web service of disclosing the play history information of the user and that of other users, ranking information generated by using play history information of many users, and so on. Note that the following description is made with reference to an exemplary case of music contents.

The server 3 regularly requests, of the PC 1 of the user who has logged in to the Web service, information concerning a content that is being played as play history data of the PC 1. When the play history data of the PC 1 has been transmitted from the PC 1 in response to the request, the server 3 acquires the play history data of the PC 1, and stores the play history information of the PC 1 in the play history database 115. In addition, the server 3 also acquires play history data of the PD 4, and stores the play history information of the PD 4 in the play history database 115. The play history data of the PD 4 is read from the PD 4 when the PD 4 has been connected to the PC 1 of the user who has logged in to the Web service, and transmitted from the PC 1.

The PC 1 stores a content purchased from a content server (not shown), a content read from a compact disc (CD), and metadata thereof. In accordance with a user operation, the PC 1 plays a desired content or transfers a user-desired content to the PD 4 connected thereto.

In the case where the PC 1 has logged in to the Web service provided by the server 3, the server 3 requests, of the PC 1, the information concerning the content that is being played; therefore, the PC 1 transmits to the server 3 the metadata of the content being played as the play history data of the PC 1. In addition, when the PD 4 has been connected to the PC 1, the PC 1 acquires, from the connected PD 4, identification information of the PD 4 and operation information concerning playing of the content. Then, the PC 1 uses the operation information to generate the play history data of the PD 4, and transmits the generated play history data of the PD 4 to the server 3 together with the identification information of the PD 4.

In the PD 4, a content transferred from the PC 1 or another PC 1 and metadata thereof are stored. The PD 4 plays the content stored therein, and also stores the operation information concerning the playing of the content, such as starting or finishing of the playing of the content. Under control of the PC 1 connected thereto, the PD 4 supplies the stored operation information or the metadata of the stored content to the PC 1. In a ROM (not shown) of the PD 4, the identification information for identifying a device of the PD 4 is stored. This identification information of the PD 4 is supplied to the PC 1 together with the operation information.

Note that although in FIG. 1, the PD 4 is shown as an example of a portable recording/playback device connected to the PC 1, any portable recording/playback device is applicable, e.g., a mobile phone.

Figure 2:
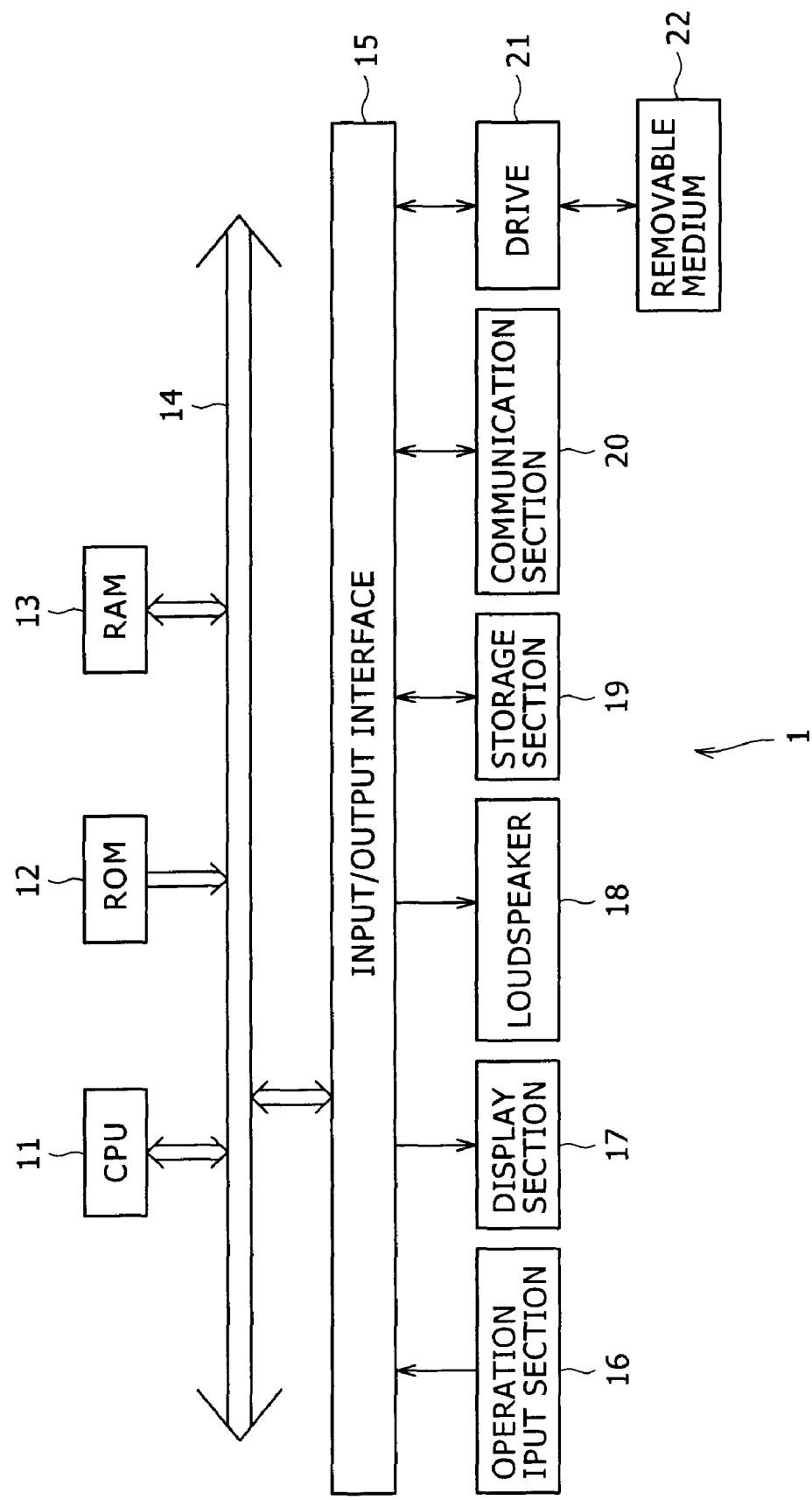
FIG. 2 is a block diagram showing an exemplary hardware structure of a PC as shown in FIG. 1.

FIG. 2 shows an exemplary hardware structure of the PC 1.

A central processing unit (CPU) 11 executes various processes in accordance with a program stored in a read only memory (ROM) 12 or a program loaded from a storage section 19 to a random access memory (RAM) 13. In the RAM 13, data necessary when the CPU 11 executes the various processes and so on are also stored as appropriate.

The CPU 11, the ROM 12, and the RAM 13 are connected to one another via a bus 14. An input/output interface 15 is also connected to the bus 14.

To the input/output interface 15 are also connected: an operation input section 16 formed by a keyboard, a mouse, or the like; a display section 17, which is a display such as a cathode ray tube (CRT), a liquid crystal display (LCD), or the like; a loudspeaker 18; the storage section 19 formed by a hard disk or the like; and a communication section 20 formed by a modem, a terminal adapter, a USB interface, or the like. The communication section 20 performs a communication process via the network 2, the USB cable, or the like.

A drive 21 is also connected, as necessary, to the input/output interface 15. A removable medium 22, such as a magnetic disk, an optical disk, a magneto-optical disk, a semiconductor memory, or the like, is mounted on the drive 21 as appropriate. A computer program read from the removable medium 22 is installed into the storage section 19 as necessary.

Although illustration is omitted, the server 3 and the PD 4 are also formed by a computer having basically the same structure as that of the PC 1 as shown in FIG. 2. Accordingly, in the following description, the structure as shown in FIG. 2 will be referred to as the structures of the server 3 and the PD 4 as well.

The CPU 11 executes a specific type of a program to allow the computer of FIG. 2 to function as the PC 1, the server 3, or the PD 4 of FIG. 1. In this case, the program can be stored beforehand in the ROM 12 or the storage section 19, which are storage media contained in the computer of FIG. 2. Alternatively, the program may be stored (recorded) temporarily or permanently in the removable medium 22, such as the magnetic disk, the optical disk, the magneto-optical disk, or the semiconductor memory, and thus be provided as so-called packaged software.

The program may be installed from the above-described removable medium 22 into the computer of FIG. 2. Alternatively, the program may be transferred from a download site to the computer of FIG. 2 in a wireless manner via a satellite for digital satellite broadcasting to be installed into the computer. Alternatively, the program may be transferred from the download site to the computer of FIG. 2 via a local area network (LAN) and the network 2 through wire to be installed into the computer.

Figure 3:
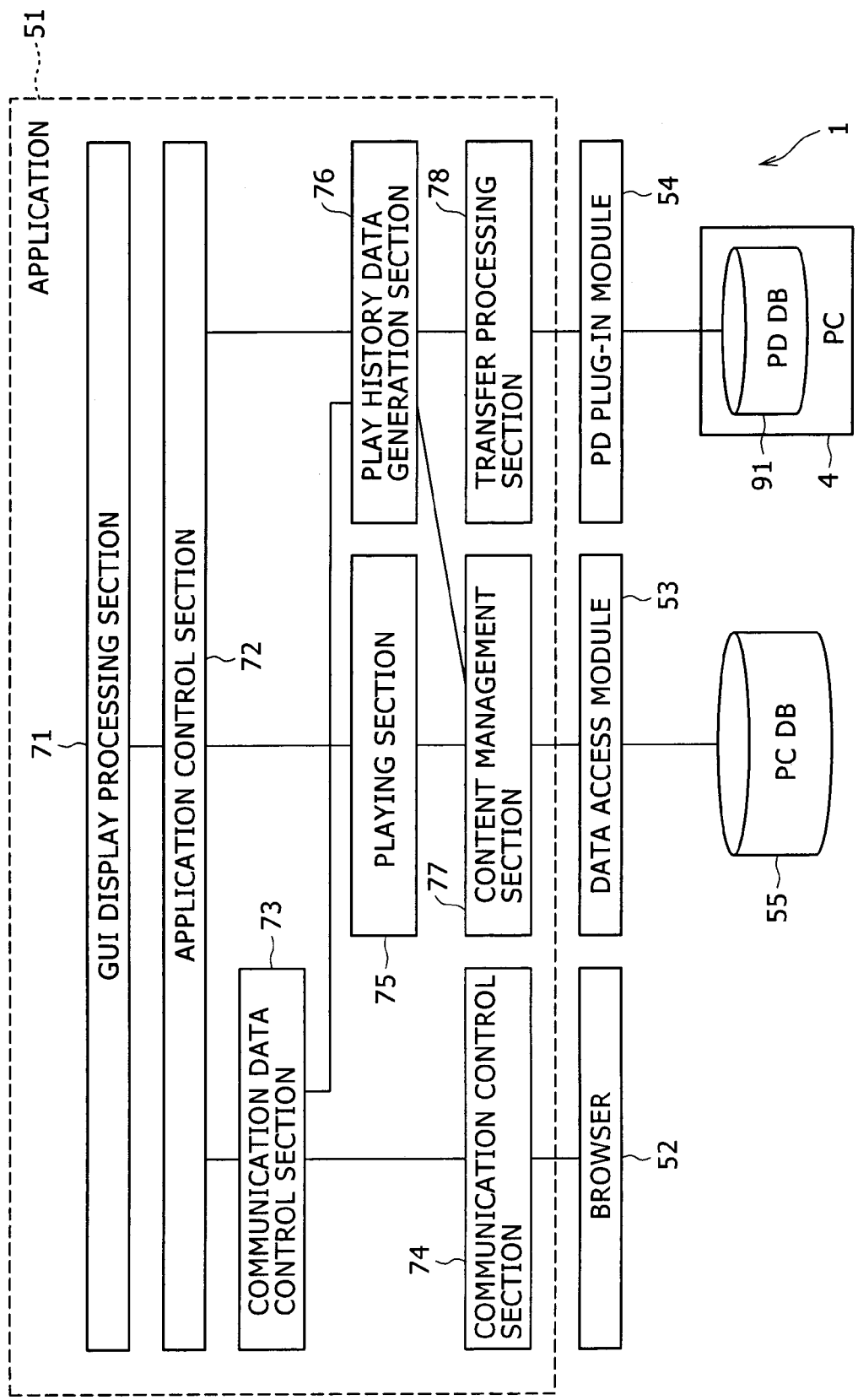
FIG. 3 is a block diagram showing an exemplary module structure of the PC as shown in FIG. 1.

FIG. 3 shows an exemplary module structure of the PC 1. That is, the module structure as shown in FIG. 3 is implemented by the CPU 11 of the PC 1.

In FIG. 3, the PC 1 includes an application 51, a browser 52, a data access module 53, a PD plug-in module 54, and a PC database (DB) 55. In FIG. 3, the PD 4 having a PD database (DB) 91 is also shown for convenience of explanation.

The application 51 is a so-called jukebox application for managing the content and the metadata thereof, playing the content, and so on. The application 51 includes a GUI display processing section 71, an application control section 72, a communication data control section 73, a communication control section 74, a playing section 75, a play history data generation section 76, a content management section 77, and a transfer processing section 78.

Under control of the application control section 72, the GUI display processing section 71 generates a predetermined GUI image, and displays an application screen made up of the generated GUI image on the display section 17, and also allows a Web service screen corresponding to Web service screen data supplied from the application control section 72 to be displayed as part of the application screen.

In accordance with an operation signal corresponding to a user operation inputted via the operation input section 16 and related to the application screen, and a request from the server 3 supplied via the communication data control section 73, the application control section 72 controls each part of the application 51 to execute a predetermined process. In addition, the application control section 72 supplies the operation signal corresponding to the user operation inputted via the operation input section 16 and related to the Web service screen to the communication data control section 73 as operation data.

The communication data control section 73 provides data (e.g., data of a user operation on the Web service screen, the play history data, etc.) to be transmitted to the server 3 to the communication control section 74. In addition, the communication data control section 73 supplies, to the application control section 72, the request from the server 3 and the Web service screen data supplied from the server 3 via the communication control section 74.

The communication control section 74 supplies, to the browser 52, data to be transmitted from the communication data control section 73 to the server 3, and also supplies, to the communication data control section 73, data from the browser 52.

Under control of the application control section 72, the playing section 75 allows the content management section 77 to retrieve information of a content which the user desires to play from the PC database 55 to acquire a file path to a content file in the storage section 19, and plays the content file based on the acquired file path.

Under control of the application control section 72, the play history data generation section 76 allows the content management section 77 to acquire, from the PC database 55, the metadata of the content that is being played, and uses the acquired metadata of the content being played to generate the play history data of the PC, and supplies the generated play history data of the PC to the communication data control section 73.

In addition, in response to the connection of the PD 4, notification of which is provided from the transfer processing section 78, the play history data generation section 76, under control of the application control section 72, acquires the operation information concerning the playing of the content in the PD 4 from the PD database 91 of the PD 4. At this time, the identification information of the PD 4 is also acquired. Then, the play history data generation section 76 controls the content management section 77 to acquire from the PC database 55 the metadata of the content played with the PD 4, and generates the play history data of the PD 4 by adding the acquired metadata to the operation information of the PD 4. The generated play history data of the PD 4 is supplied to the communication data control section 73 together with the identification information of the PD 4.

Note that, for example, metadata of a content transferred from another PC 1 and then stored in the PD 4 may not be stored in the PC database 55. In this case, the content management section 77 notifies the play history data generation section 76 that the metadata of the content is not present, and accordingly the play history data generation section 76 controls the transfer processing section 78 to acquire the metadata of the content played with the PD 4 from the PD database 91 in the PD 4.

The content management section 77 controls the data access module 53 to search the PC database 55 for the information (e.g., the metadata of the content, the file path to the content file stored in the storage section 19, etc.) concerning the content specified by the playing section 75 or the play history data generation section 76 to acquire the information.

Based on notification from the PD plug-in module 54, the transfer processing section 78 notifies the play history data generation section 76 of the connection of the PD 4, and also allows the PD plug-in module 54 to acquire information specified by the play history data generation section 76. Although illustration of control is omitted, under control of the application control section 72, the transfer processing section 78 transfers the content or the metadata thereof managed by the content management section 77 to the PD 4 via the PD plug-in module 54.

The browser 52 analyzes a layout of, for example, music data, image data, and data constituting the Web service screen data transmitted from the server 3 or the like via the network 2, and supplies to the communication control section 74 the Web service screen data as analyzed. In addition, the browser 52 transmits, to the server 3 via the network 2, the data of the user operation on the Web service screen supplied from the communication data control section 73 via the communication control section 74.

The browser 52 supports a Java (registered trademark) Script (trade mark) interface, and supplies to the communication control section 74 the request from the server 3 for the information concerning the content that is being played, and also transmits the play history data of the PC 1 or the play history data of the PD 4 supplied from the communication control section 74 to the server 3 via the Java (registered trademark) Script interface and the network 2.

Under control of the content management section 77, the data access module 53 performs reading and writing of data stored in the PC database 55.

The PD plug-in module 54 functions as an interface for communication with the PD 4, and notifies the transfer processing section 78 of the connection of the PD 4 to the PC 1. In addition, the PD plug-in module 54 transfers data in the PC 1 from the transfer processing section 78 to the PD 4, and, under control of the transfer processing section 78, acquires information or data in the PD 4 and supplies the acquired information or data to the transfer processing section 78. Note that the PD plug-in module 54 is provided separately for each model of the PD.

The PC database 55 stores the information (i.e., the metadata) concerning the content corresponding to the content file stored in the storage section 19.

In the PD database 91 of the PD 4, an operation information table in which the operation information concerning the playing of the content in the PD 4 is stored and a content information table for managing information of the content in the PD 4 are stored.

Figure 4:
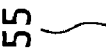
FIG. 4 shows an exemplary structure of a PC database as shown in FIG. 3.

FIG. 4 shows an exemplary structure of the PC database 55. In the PC database 55, "ID", "Title", "Artist Name", "Album Title", and "Content ID" are stored as the metadata of the contents on a content-by-content basis. "IDs" are identifications (ID) for management of the contents in the PC 1. "Titles" are song titles of the contents. "Content IDs" are assigned to the contents uniquely. "Content IDs" are IDs shared with the PD 4.

Specifically, for a content whose ID is "1", a title "Song Title 1", an artist name "Artist Name 1", an album title "Album Title 1", and a content ID "010F500000040000007" are stored. For a content whose ID is "2", a title "Song Title 2", an artist name "Artist Name 2", an album title "Album Title 2", and a content ID "010F50000004000001B" are stored. For a content whose ID is "3", a title "Song Title 3", an artist name "Artist Name 2", an album title "Album Title 2", and a content ID "010F5000000400000C3" are stored.

For a content whose ID is "4", a title "Song Title 4", an artist name "Artist Name 3", an album title "Album Title 3", and a content ID "010F5000000400000F7" are stored. For a content whose ID is "5", a title "Song Title 5", an artist name "Artist Name 3", an album title "Album Title 4", and a content ID "010F5000000400000AD" are stored.

Although not shown in the figure, in the PC database 55, the file path to the content file stored in the storage section 19 is also stored. Moreover, in the PC database 55, other metadata (e.g., lyrics, a jacket image, etc.) than the title, the artist name, and the album title may also be stored. Further, in the PC database 55, an image associated by the user with the content may also be stored as the metadata.

FIG. 5 shows an exemplary structure of the operation information table in the PD database 91 of the PD 4.

In FIG. 5, an operation information table 101 is composed of "Event ID", "Content ID", and "Time Stamp". "Event ID" identifies an operation. "Content ID" is shared with the PC 1. "Time Stamp" indicates a time (year, month, day, hour, minute, and second) at which the operation was performed. For example, event ID "1" indicates start of playing; event ID "2" indicates stop or pause of playing; event ID "3" indicates start of fast forward; and event ID "4" indicates start of rewind.

In the example of FIG. 5, in the operation information table 101 are stored: a piece of operation information in which the event ID is "1 (start of playing)", the content ID is "010F500000040000007", and the time stamp is "2006-07-25 11:30:10"; a piece of operation information in which the event ID is "2 (stop of playing)", the content ID is "010F500000040000007", and the time stamp is "2006-07-25 11:35:01"; a piece of operation information in which the event ID is "1 (start of playing)", the content ID is "010F50000004000001B", and the time stamp is "2006-07-25 11:35:02"; and a piece of operation information in which the event ID is "2 (stop of playing)", the content ID is "010F50000004000001B", and the time stamp is "2006-07-25 11:38:20".

That is, regarding the content ID "010F500000040000007", operation information representing that a playback start time is 11:30:10 (hours:minutes:seconds) on July 25, 2006, and a playback stop time is 11:35:01 on July 25, 2006 is stored. Acquisition of this operation information makes it known that a playing time of the content whose content ID is "010F500000040000007" is four minutes and 51 seconds.

Further, regarding the content ID "010F50000004000001B", operation information representing that the playback start time is 11:35:02 on July 25, 2006, and the playback stop time is 11:38:20 on July 25, 2006 is stored. Acquisition of this operation information makes it known that the playing time of the content whose content ID is "010F50000004000001B" is three minutes and 18 seconds.

Figure 6:
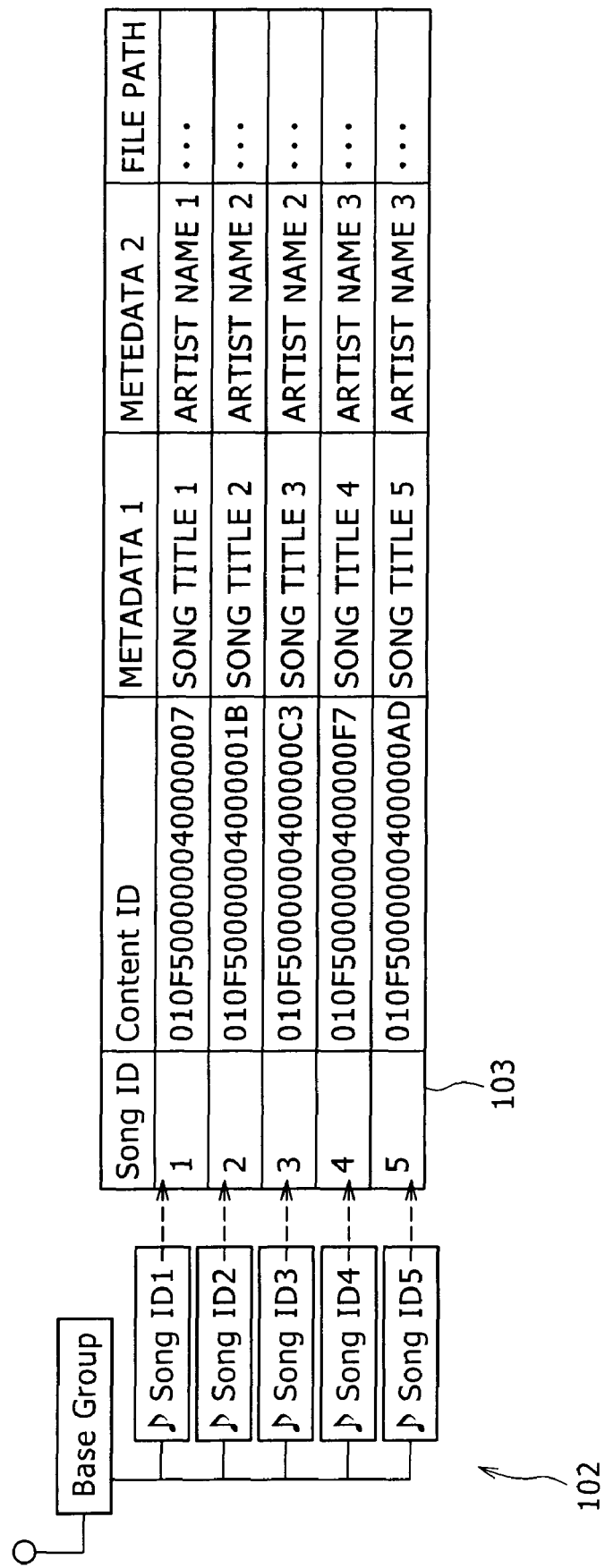
FIG. 6 shows an exemplary structure of a content information table in the PD database.

FIG. 6 shows an exemplary structure of the content information table in the PD database 91 of the PD 4. In FIG. 6, the content information table is composed of a basic group tree table 102 and an additional information table 103.

The basic group table 102 collectively manages song IDs of the contents under a base group. The song IDs are used for managing the contents in the PD 4. When the information of the content in the PD 4 is to be obtained, the basic group table 102 is accessed first. In the example of FIG. 6, the contents having song IDs 1 to 5, respectively, are managed under the base group. The metadata, the file path, etc., of the content can be acquired from the basic group table 102 via the additional information table 103 joined to the basic group table 102 by the song IDs.

The additional information table 103 stores additional information of the contents, such as "Song IDs", "Content IDs", metadata 1, metadata 2, file paths, etc., of the contents. In the example of FIG. 6, regarding a content whose song ID is "1", the content ID "010F500000040000007", metadata 1 "Song Title 1", metadata 2 "Artist Name 1", and a file path ". . ." are stored as the additional information. Regarding a content whose song ID is "2", the content ID "010F50000004000001B", metadata 1 "Song Title 2", metadata 2 "Artist Name 2", and a file path ". . ." are stored as the additional information.

Regarding a content whose song ID is "3", the content ID "010F5000000400000C3, metadata 1 "Song Title 3", metadata 2 "Artist Name 2", and a file path ". . ." are stored as the additional information. Regarding a content whose song ID is "4", the content ID "010F5000000400000F7", metadata 1 "Song Title 4", metadata 2 "Artist Name 3", and a file path ". . ." are stored as the additional information. Regarding a content whose song ID is "5", the content ID "010F5000000400000AD", metadata 1 "Song Title 5", metadata 2 "Artist Name 3", and a file path ". . ." are stored as the additional information.

Although not shown in the figure, "Album Title" is also stored as the metadata in the additional information table 103. Note that the minimum necessary amount of metadata is stored in the additional information table 103 because of the limitation of storage capacity.

Figure 7:
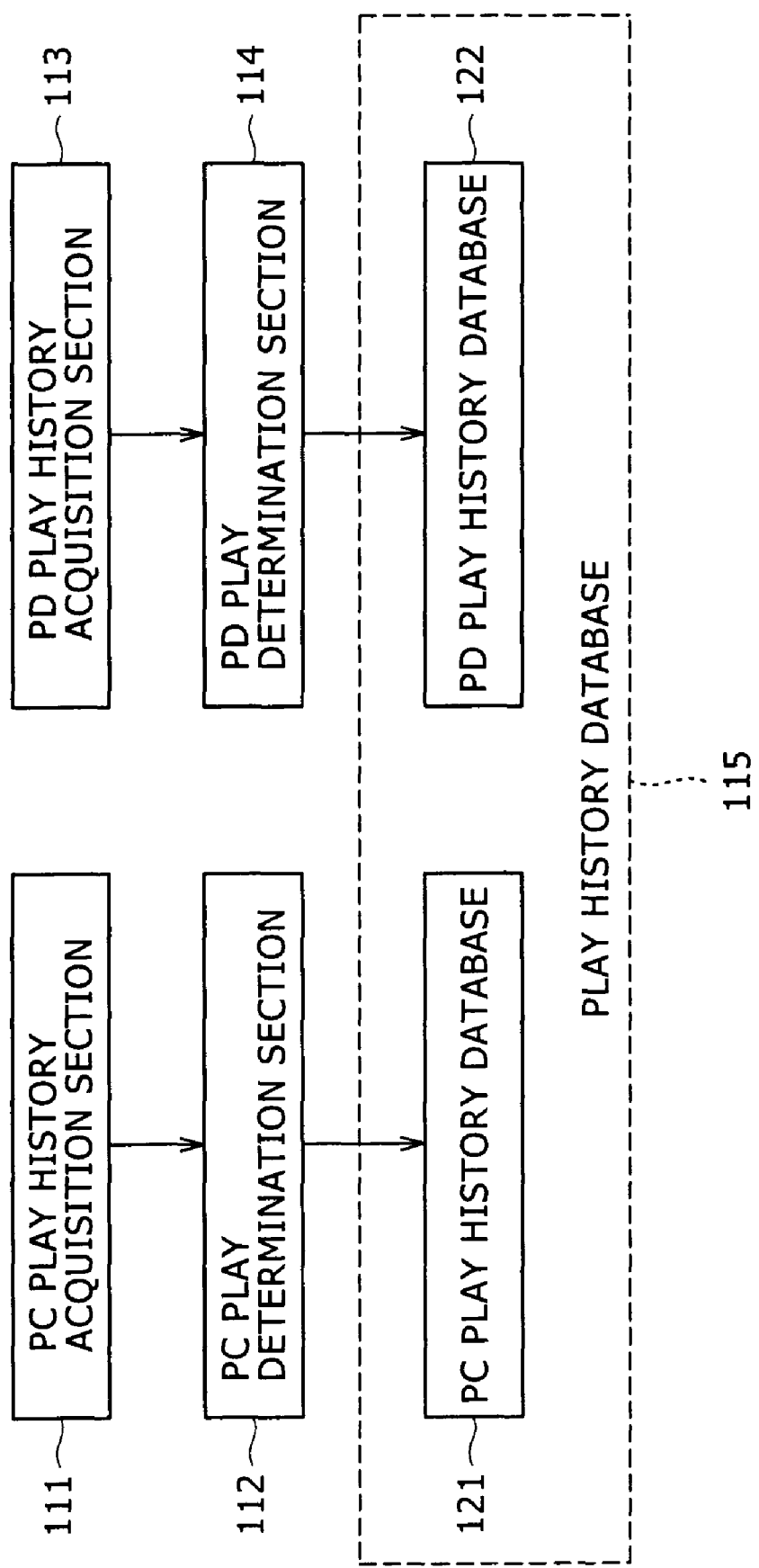
FIG. 7 is a block diagram showing an exemplary functional structure of a server as shown in FIG. 1.

FIG. 7 shows an exemplary functional structure of the server 3 as shown in FIG. 1. Functional blocks shown in FIG. 7 are realized by the CPU 11 of the server 3 executing a specific program, for example.

In FIG. 7, the server 3 includes: a PC play history acquisition section 111 and a PC play determination section 112 for acquiring and storing the play history information of the PC 1; a PD play history acquisition section 113 and a PD play determination section 114 for acquiring and storing the play history information of the PD 4; and the play history database 115 composed of a PC play history database 121 and a PD play history database 122.

The PC play history acquisition section 111 regularly (e.g., at intervals of 5 or 10 seconds) request, of the PC 1 of the user who has logged in to the Web service, the play history data (actually, the information of the content that is being played) of the PC 1, and acquires the play history data of the PC 1 transmitted from the PC 1 in response to the request and supplies the acquired play history data of the PC 1 to the PC play determination section 112.

The PC play determination section 112 accumulates the play history data of the PC 1 for a predetermined time, and, referring to the accumulated play history data of the PC 1, determines whether the content described in the play history data has been played. If it is determined that the content described in the play history data has been played, the PC play determination section 112 stores the play history data in the PC play history database 121 as the play history information of the PC 1.

The PD play history acquisition section 113 acquires the play history data of the PD 4, and supplies the acquired play history data of the PD 4 to the PD play determination section 114. Note that the play history data of the PD 4 is read from the PD 4 and then transmitted from the PC 1, when the PD 4 has been connected to the PC 1 of the user who has logged in to the Web service. At this time, the identification information of the PD 4, which is transmitted together with the play history data of the PD 4, is also supplied to the PD play determination section 114.

Referring to the play history data of the PD 4, the PD play determination section 114 determines whether the content described in the play history data has been played. If it is determined that the content described in the play history data has been played, the PD play determination section 114 stores the play history data and the identification information of the PD 4 in the PD play history database 122 as the play history information of the PD 4.

In the PC play history database 121, the play history information of the PC 1 is stored on a user-by-user basis. In the PD play history database 122, the play history information of the PD 4 is stored, as classified by the identification information of the PD 4 of the user. That is, in the case where the user possesses multiple portable terminals (e.g., the PD, the mobile phone, etc.), the play history information can be stored on a device-by-device basis.

Next, referring to FIGS. 8 and 9, an outline of the generation and acquisition of the play history data between the server 3 and the PC 1 will now be described below. First, referring to FIG. 8, the generation and acquisition of the play history data of the PC between the server 3 and the PC 1 will now be described below.

The server 3 regularly (e.g., at intervals of 5 or 10 seconds) requests, of the PC 1 of the user who has logged in to the Web service, the information (i.e., the metadata) of the content that is currently being played as the play history data of the PC. In response thereto, the PC 1 acquires the metadata of the content being played from the PC database 55, and uses the acquired metadata of the content being played to generate the play history data of the PC.

Figure 8:
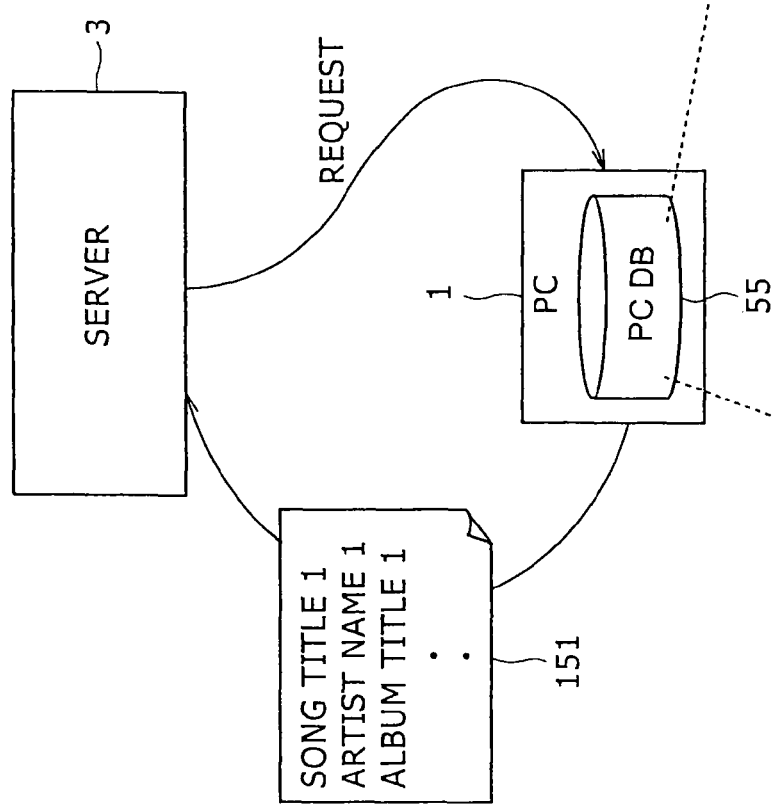
FIG. 8 is a conceptual diagram illustrating generation and acquisition of play history data of the PC.

Specifically, in the example of FIG. 8, regarding the content whose ID is "1", information that the title, the artist name, the album title, and the content ID are, respectively, "Song Title 1", "Artist Name 1", "Album Title 1", and "010F500000040000007" is stored in the PC database 55. Regarding the content whose ID is "2", information that the title, the artist name, the album title, and the content ID are, respectively, "Song Title 2", "Artist Name 2", "Album Title 2", and "010F50000004000001B" is stored in the PC database 55.

In the case where the content that is currently being played is the content whose ID is "1", for example, the information of the content whose ID is "1", i.e., "Song Title 1", "Artist Name 1", and "Album Title 1", is acquired from the PC database 55 as the metadata of the content being played. Accordingly, the PC 1 generates play history data 151 of the PC in which "Song Title 1", "Artist Name 1", "Album Title 1", and the like are described, and transmits the generated play history data 151 of the PC to the server 3. As a result, the server 3 acquires the play history data 151 of the PC, and the play history information of the PC based on the play history data 151 of the PC is stored in the server 3.

In contrast, the generation and acquisition of the play history data of the PD is performed in a manner as illustrated in FIG. 9. Next, referring to FIG. 9, the generation and acquisition of the play history data of the PD between the server 3 and the PC 1 will now be described below.

When the PD 4 is connected to the PC 1 via the USB cable or the like, the PC 1 acquires from the PD 4 (i.e., the PD database 91) the operation information concerning the playing of the content stored in the operation information table 101. At this time, the identification information 162 of the PD 4 stored in the ROM of the PD 4 is also acquired at the same time.

In the example of FIG. 9, in the operation information table 101 are stored: the piece of operation information in which the event ID is "1 (start of playing)", the content ID is "010F500000040000007", and the time stamp is "2006-07-25 11:30:10"; the piece of operation information in which the event ID is "2 (stop of playing)", the content ID is "010F500000040000007", and the time stamp is "2006-07-25 11:35:01"; the piece of operation information in which the event ID is "1 (start of playing)", the content ID is "010F50000004000001B", and the time stamp is "2006-07-25 11:35:02"; and the piece of operation information in which the event ID is "2 (stop of playing)", the content ID is "010F50000004000001B", and the time stamp is "2006-07-25 11:38:20".

That is, regarding the content ID "010F500000040000007", the PC 1 acquires the operation information that the playback start time is 11:30:10 (hours:minutes:seconds) on July 25, 2006, and the playback stop time is 11:35:01 on July 25, 2006. In addition, regarding the content ID "010F50000004000001B", the PC 1 acquires the operation information that the playback start time is 11:35:02 on July 25, 2006, and the playback stop time is 11:38:20 on July 25, 2006.

As a result, it becomes known that the playing time of the content whose content ID is "010F500000040000007" is four minutes and 51 seconds, and that the playing time of the content whose content ID is "010F50000004000001B" is three minutes and 18 seconds.

When the operation information has been acquired, the PC 1 acquires from the PC database 55 the information (i.e., the metadata) of the contents whose content IDs are described in the operation information. In the example of FIG. 9, the title "Song Title 1", the artist name "Artist Name 1", and the album title "Album Title 1" of the content whose content ID is "010F500000040000007" are acquired from the PC database 55. In addition, the title "Song Title 2", the artist name "Artist Name 2", and the album title "Album Title 2" of the content whose content ID is "010F50000004000001B" are acquired from the PC database 55.

Figure 18:
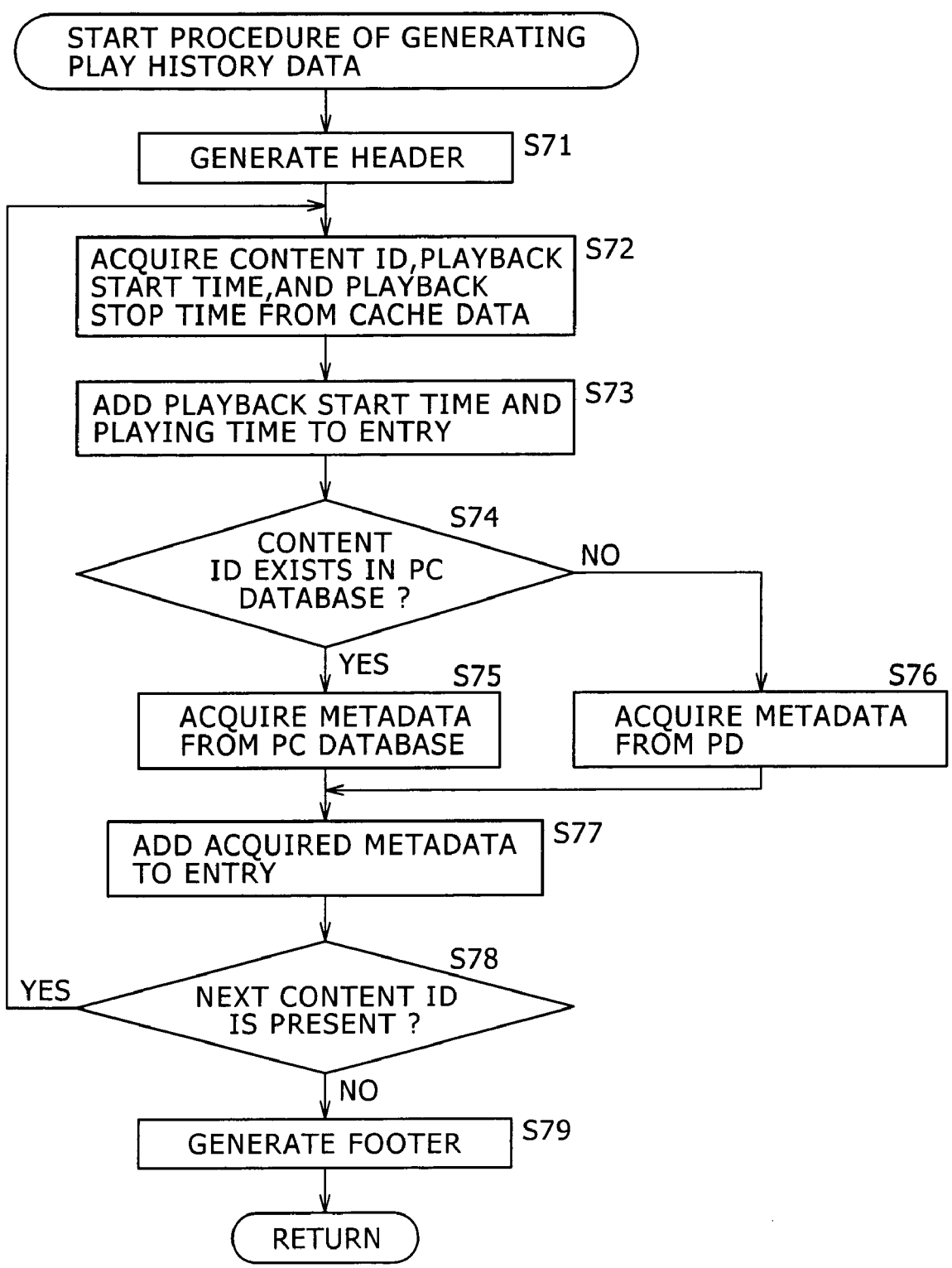
FIG. 18 is a flowchart illustrating a procedure of generating the play history data of the PD performed in step S56 of FIG. 12.

While a detailed description will be provided later with reference to FIG. 18, in the case where the information of the content whose content ID is described in the operation information may not be acquired from the PC database 55, the information of the content whose content ID is described in the operation information is acquired from the content information table of the PD database 91 of the PD 4.

The PC 1 adds the content information in the PC database 55 to the operation information in the PD 4 to generate play history data 161 of the PD in an XML format.

In the example of FIG. 9, the play history data 161 of the PD represents the play history data of the content whose content ID is "010F500000040000007". In the play history data 161 of the PD, <entry> and </entry> tags indicative of the play history data of one content are described in first and seventh lines. In a second line, <artist> and </artist> tags that indicate that the artist name of the content is "Artist Name 1" are described. In a third line, <album> and </album> tags that indicate that the album title of the content is "Album Title 1" are described. In a fourth line, <track> and </track> tags that indicate that the song title of the content is "Song Title 1" are described. In a fifth line, <duration> and </duration> tags that indicate the playing time (four minutes and 51 seconds) are described. In a sixth line, <date> and </date> tags that indicate the playback start time (11:30:10 on July 25, 2006) are described.

Here, the artist name, the album title, and the song title of the content in the second, third, and fourth lines are acquired from the PC database 55, and the playing time and the playback start time in the fifth and sixth lines are acquired from the PD database 91 of the PD 4, so that the play history data 161 of the PD is generated. In other words, the artist name, the album title, and the song title (i.e., the metadata) in the second, third, and fourth lines are added to the playing time and the playback start time (i.e., the operation information) in the fifth and sixth lines to generate the play history data 161 of the PD.

Then, the PC 1 transmits, to the server 3, the play history data 161 of the PD generated in the above-described manner together with the identification information 162. As a result, the server 3 acquires the play history data 161 of the PD along with the identification information 162, and the play history information of the PD based on the play history data 161 of the PD is stored in the server 3.

As described above, the server 3 stores not only the play history information of the PC but also the play history information of the PD, resulting in storage of an increased amount of play history information. The pieces of play history information are disclosed by the Web service of the server 3 to the user himself or herself or other people, or used thereby to generate the ranking information or the like to be disclosed.

Figure 10:
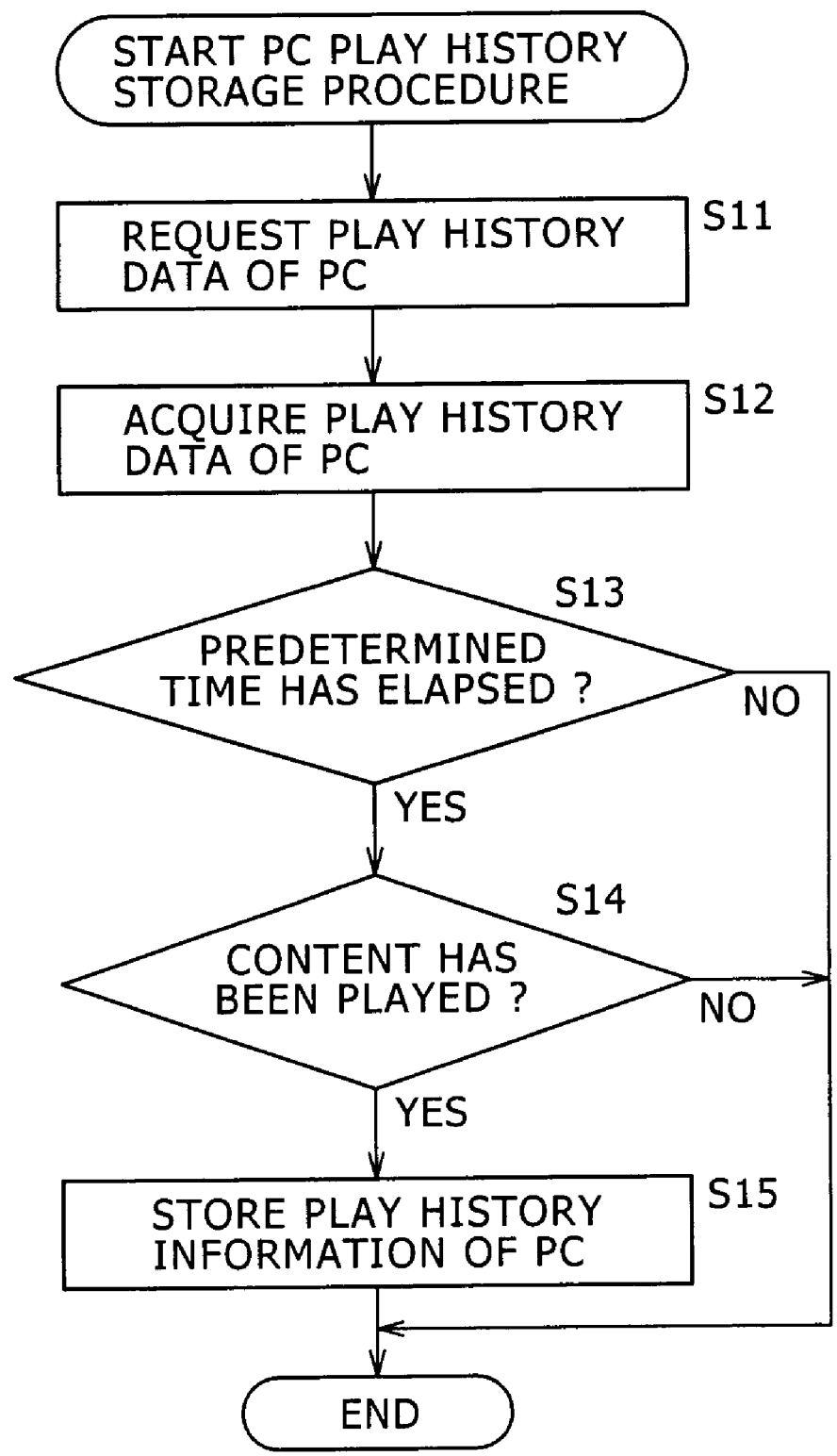
FIG. 10 is a flowchart illustrating a PC play history storage procedure performed by the server.

Next, with reference to a flowchart of FIG. 10, a PC play history storage procedure performed by the server 3 will now be described below. Besides the procedure performed by the server 3 as illustrated in FIG. 10, a PC play history transmission procedure performed by the PC 1 will also be described below with reference to a flowchart of FIG. 11. The schematic diagram of FIG. 8 described above will be referred to as necessary.

The user operates the operation input section 16 to activate the application 51 in the PC 1 and issue an instruction to transmit a user ID and a password to the Web service of the server 3, so that the user logs in to the Web service of the server 3. That is, authentication data of the user composed of the user ID and the password is supplied from the application control section 72 to the browser 52 via the communication data control section 73 and the communication control section 74. The browser 52 transmits the authentication data of the user to the Web service of the server 3 via the network 2. As a result, the user of the PC 1 logs in to the Web service of the server 3.

Further, the user operates the operation input section 16 to issue an instruction to play the desired content stored in the PC 1. In response thereto, based on the file path acquired from the content management section 77, the playing section 75 acquires the user-desired content file and plays it.

The PC play history acquisition section 111 of the server 3 uses a built-in timer to perform a timing operation, and regularly (e.g., at intervals of 5 or 10 seconds) starts the PC play history storage procedure as illustrated in FIG. 10.

At step S11, the PC play history acquisition section 111 requests, of the PC 1, the play history data of the PC via the network 2 as described above with reference to FIG. 8. Actually, the information of the content that is being played is requested.

Figure 11:
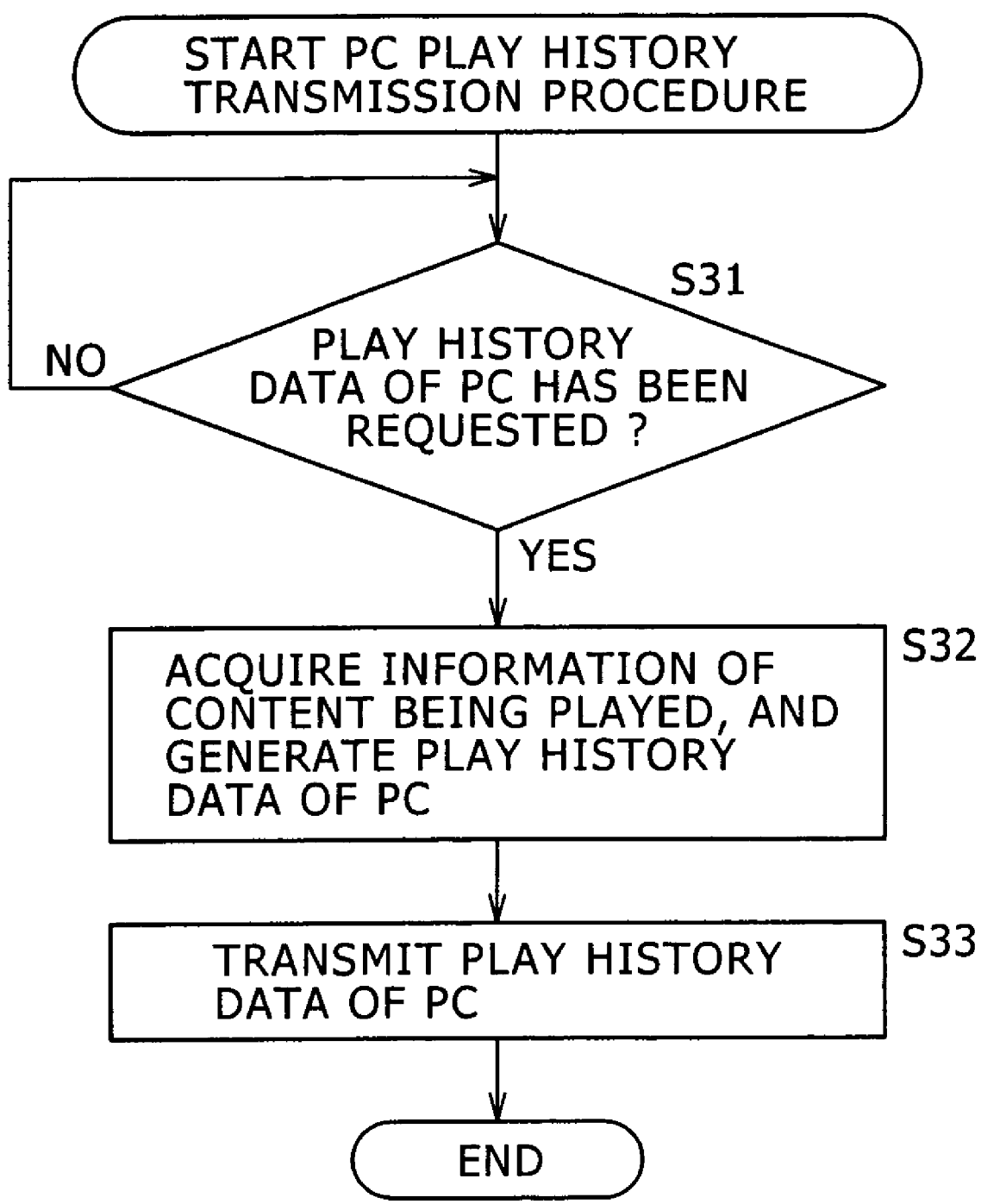
FIG. 11 is a flowchart illustrating a PC play history transmission procedure performed by the PC.

On the other hand, at step S31 of FIG. 11, the browser 52 of the PC 1 is waiting until the play history data of the PC is requested by the server 3. When the request has been transmitted from the server 3 via the network 2, the browser 52 determines that the play history data of the PC has been requested by the server 3 at step S31. Then, control proceeds to step S32.

The request for the play history data of the PC is supplied to the play history data generation section 76 via the communication control section 74, the communication data control section 73, and the application control section 72. At step S32, the play history data generation section 76 controls the content management section 77 to acquire the metadata of the content being played from the PC database 55, and uses the acquired metadata of the content being played to generate the play history data of the PC.

In the case where the content that is currently being played by the playing section 75 is the content whose ID is "1", for example, "Song Title 1", "Artist Name 1", and "Album Title 1" of the content whose ID is "1" are acquired from the content management section 77 as the metadata of the content being played. Therefore, as illustrated in FIG. 8, the play history data generation section 76 generates the play history data 151 of the PC in which "Song Title 1", "Artist Name 1", "Album Title 1", and the like are described, and supplies the generated play history data 151 of the PC to the communication data control section 73. The communication data control section 73 supplies the play history data 151 of the PC to the browser 52 via the communication control section 74.

At step S33, the browser 52 transmits the play history data 151 of the PC to the server 3 via the Java (registered trademark) Script interface and the network 2.

In response thereto, at step S12 of FIG. 10, the PC play history acquisition section 111 of the server 3 acquires the play history data 151 of the PC, and supplies the acquired play history data 151 of the PC to the PC play determination section 112.

At step S13, the PC play determination section 112 is performing the timing operation using the built-in timer, and determines whether the predetermined time has elapsed. If it is determined that the predetermined time has elapsed, control proceeds to step S14. The predetermined time corresponds to a time necessary for accumulation of a sufficient amount of play history data of the PC to allow the determination at step S14 of whether the content has been played.

At step S14, referring to the play history data 151 of the PC 1 accumulated for the predetermined time, the PC play determination section 112 determines whether the content indicated by the play history data 151 of the PC has been played.

That is, because the play history data 151 of the PC 1 in which the metadata of the content being played is described is acquired at regular intervals, it is possible to recognize a time for which the content has been played with the PC 1 by referring to the play history data 151 of the PC 1 accumulated for the predetermined time. Therefore, based on the play history data 151 of the PC 1 accumulated for the predetermined time, it is possible to determine an actual playing time Ti of the content indicated by the play history data 151 of the PC. In addition, an entire playing time T2 of the content described in the play history data 151 of the PC is obtained from a metadata DB (not shown) contained in the server 3.

Therefore, the PC play determination section 112 compares the actual playing time T1 of the content with the entire playing time T2 of the content, and when the actual playing time T1 of the content is more than half the entire playing time T2 (i.e., T1>T2/2), for example, the PC play determination section 112 determines at step S14 that the content has been played, and control proceeds to step S15.

At step S15, the PC play determination section 112 stores the metadata, obtained from the play history data 151 of the PC, of the content that has been determined to have been played, the determined playing time of the content, and the like in the PC play history database 121 as the play history information of the PC.

Meanwhile, if it is determined at step S13 that the predetermined time has not elapsed, which means that the accumulated play history data of the PC is not sufficient to allow the determination of whether the content has been played, the PC play history storage procedure is terminated without the play history information of the PC being stored. Similarly, if it is determined at step S14 that the content has not been played, the PC play history storage procedure is terminated without the play history information of the PC being stored.

In the above-described manner, the play history information of the PC is stored in the play history database 115 of the server 3 on a user-by-user basis.

Next, with reference to a flowchart of FIG. 12, a PD play history transmission procedure performed by the PC 1 will now be described below.

The user operates the operation input section 16 to activate the application 51 in the PC 1, and connects the PD 4 to the PC 1 via the USB cable or the like. When the application 51 has been activated, the GUI display processing section 71, under control of the application control section 72, allows the display section 17 to display an application screen 201 (see FIG. 13 described later).

At step S51, the transfer processing section 78 is waiting until the PD 4 is connected to the PC 1, and when it is determined based on the notification from the PD plug-in module 54 that the PD 4 has been connected to the PC 1, the transfer processing section 78 notifies the play history data generation section 76 of the connection of the PD 4, and control proceeds to step S52.

In response to the notification of the connection of the PD 4 provided from the play history data generation section 76, the application control section 72 checks setting of notification of song information. Details of the setting of the notification of the song information will be described later with reference to FIG. 14. In the setting of the notification of the song information in the present example, it is so configured that a dialog will be displayed every time for the user to specify whether or not to provide notification to the Web service when play history information exists in the device. Accordingly, based on the setting of the notification of the song information, the application control section 72 displays on the application screen 201 a notification confirmation window 202 for asking the user to specify whether or not to provide the notification of the play history.

Figure 13:
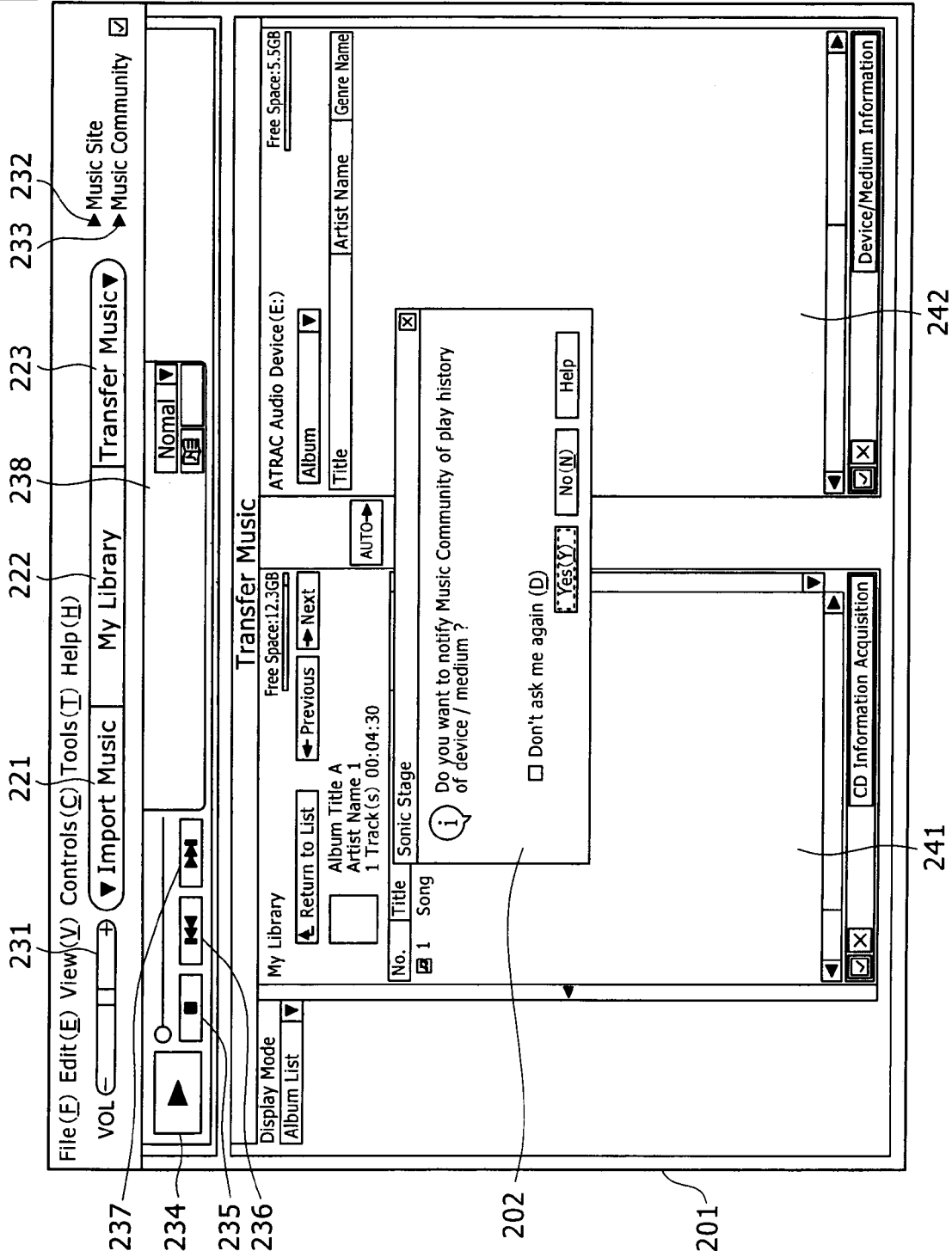
FIG. 13 shows an exemplary screen displayed on a display section.

FIG. 13 illustrates an exemplary screen displayed on the display section 17. In FIG. 13, the application screen 201 and the notification confirmation window 202 superimposed on the application screen 201 are shown.

The application screen 201 is composed of a basic feature display screen 211 and an optional display screen 212. The basic feature display screen 211 is displayed at all times. The optional display screen 212 is changed in display depending on which of an "Import Music" button 221, a "My Library" button 222, and a "Transfer Music" button 223 arranged on the basic feature display screen 211 is selected. In the example of FIG. 13, a screen corresponding to the selection of the "Transfer Music" button 223 is displayed in the optional display screen 212.

In the basic feature display screen 211 are arranged the following buttons from left to right: a volume button 231 for adjusting a volume; the import button 221 for importing (i.e., encoding and recording) the content from the CD, the content server not shown, or the like; the "My Library" button 222 for displaying the information of the content registered in the PC database 55; the transfer button 223 for transferring the content, a playlist, or the like to the PD 4; a music site button 232 for accessing a content server (i.e., a music site) for providing the content; and a music community button 233 for accessing the server 3 for providing the Web service (i.e., a music community).

In addition, in the basic feature display screen 211, a play operation button 234, a stop button 235, a "Previous" button 236, a "Next" button 237, a presentation section 238, and the like are arranged below the volume button 231 and so on. The play operation button 234 is used to issue an instruction to play the content when the content is not played, and issue an instruction to cause the playing of the content to pause when the content is being played. The stop button 235 is used to stop the playing of the content. The "Previous" button 236 is used to specify a content previous to a content that is a current object of playing. The "Next" button 237 is used to specify a content next to the content that is the current object of playing. The presentation section 238 is used to present a content name, the artist name, an image, etc, of the content being played.

In the optional display screen 212, a "My Library" display section 241 and a PD display section 242 are displayed as the screen corresponding to the selection of the "Transfer Music" button 223. The "My Library" display section 241 displays the information of the content registered in the PC database 55 of the PC 1. The PD display section 242 displays the information of the content stored in the connected PD 4.

In the notification confirmation window 202 superimposed on the application screen 201, a message "Do you want to notify Music Community (i.e., the Web service) of play history of device/medium?", a "Yes" button, a "No" button, and a "Help" button are displayed to ask the user to specify whether or not to provide the notification of the play history. In addition, a message "Don't ask me again" is also displayed along with a check button. By marking the check button, it is possible to cause the window 202 not to appear again.

The user operates the operation input section 16 to select the "Yes" button on the notification confirmation window 202. In response thereto, the application control section 72 controls the play history data generation section 76 to provide the notification of the play history of the PD.

Figure 14:
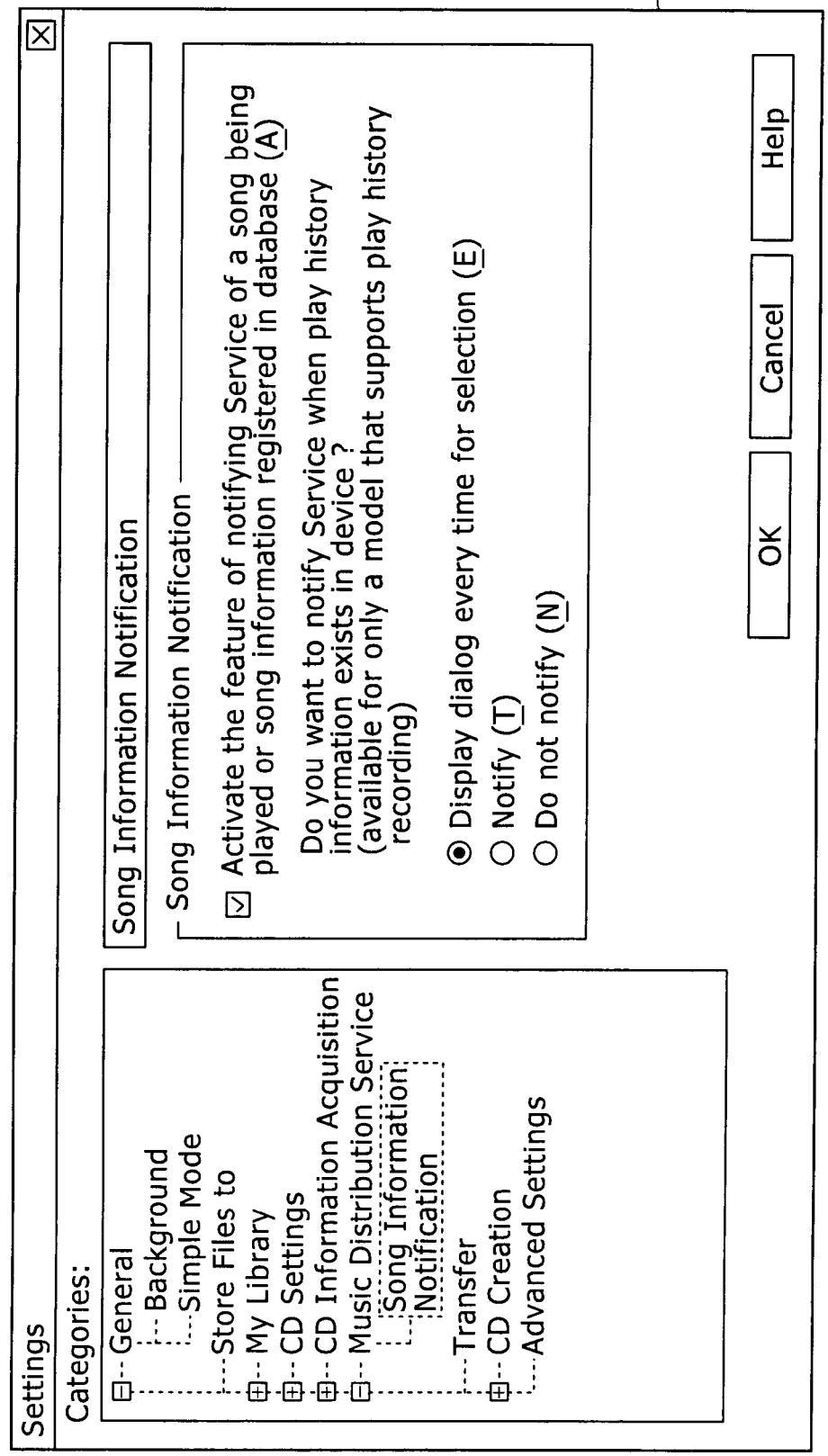
FIG. 14 shows an exemplary display of a Settings window.

Note that the above-described setting of the notification of the song information is user-configurable as illustrated in FIG. 14. When the user operates the operation input section 16 to select "Settings" from a menu bar on the application screen, a Settings window 251 is displayed on the application screen 201 of the display section 17 under control of the application control section 72.

In the Settings window 251 of FIG. 14, "Song Information Notification" shown under a Music Distribution Service category is selected from a Categories list on the left-hand side, and setting options related to the notification of the song information are displayed on the right-hand side.

Regarding the notification of the song information, it is possible to specify beforehand whether or not to activate a feature of notifying the Web service of the song (i.e., the content) being played or the song information registered in the database (i.e., the PC database 55) (that is, whether or not to transmit the play history data of the PC as described above with reference to FIG. 11); and whether or not to provide the notification to the Web service when the play history information exists in the device (i.e., the PD 4), or whether or not to display the dialog every time to ask the user to specify.

In the example of FIG. 14, the feature of notifying the Web service of the song being played or the song information registered in the database is configured to be effective, and it is so configured that the dialog will be displayed every time to ask the user to specify whether or not to provide the notification to the Web service when the play history information exists in the device.

In the case where it is so configured that the notification will be provided to the Web service when the play history information exists in the device or that the notification will not be provided to the Web service when the play history information exists in the device, for example, the application control section 72 checks this setting to determine whether or not to control the play history data generation section 76 to provide the notification of the play history of the PD.

Returning to FIG. 12, at step S52, the play history data generation section 76 determines whether or not to provide the notification of the play history. If, under control of the application control section 72, it is determined that the notification of the play history is to be provided, the play history data generation section 76, at step S53, allows the transfer processing section 78 to acquire, from the PD 4, the operation information concerning the playing of the content and the identification information, and stores them as cache data.

That is, as described above with reference to FIG. 9, in the PD database 91 of the PD 4, the operation information table 101 that stores the operation information concerning the playing of the contents is constructed. In addition, the identification information for identifying the device of the PD 4 is stored in the ROM of the PD 4.

Therefore, at step S53, the transfer processing section 78 controls the PD plug-in module 54 to acquire, from the operation information table 101, the operation information concerning the playing of the contents and, from the ROM of the PD 4, the identification information of the PD 4, and allows the acquired operation information and identification information to be stored as the cache data in a cache contained in the play history data generation section 76. After the acquisition of the operation information, the information in the operation information table 101 is reset in the PD 4.

At step S54, the application control section 72 determines whether the logging in to the Web service has already been completed. If it is determined that the logging in to the Web service has not been completed, the application control section 72, at step S55, controls the GUI display processing section 71 to display a log-in window 261 on the application screen 201 of the display section 17 as shown in FIG. 15.

In the log-in window 261 as shown in FIG. 15, a message "You need to log in to Music Community for providing notification of play history", a mail address input space, a password input space, a "New Registration" button, an "OK" button, and a "Cancel" button are displayed.

The user, who has already been registered for the Web service of the server 3, operates the operation input section 16 to enter a mail address used for registration in the mail address input space on the log-in window 261, enter the password in the password input space, and select the "OK" button, thereby instructing the PC 1 to log in to the Web service.

The application control section 72 supplies the mail address and password entered via the operation input section 16 to the browser 52 via the communication data control section 73 and the communication control section 74. The browser 52 transmits the mail address and password supplied from the communication control section 74 to the server 3 via the Java (registered trademark) Script interface and the network 2. As a result, the logging in of the user of the PC 1 is permitted in the server 3.

After the process of step S55, control returns to step S54, and the subsequent process is repeated until it is determined that the logging in to the Web service has been completed.

Meanwhile, if it is determined at step S54 that the logging in to the Web service has already been completed, control proceeds to step S56 with the process of step S55 skipped.

At step S56, the play history data generation section 76 executes a process of generating the play history data of the PD. Details of the process of generating the play history data of the PD will be described later with reference to FIG. 18. In the process of generating the play history data of the PD performed at step S56, the operation information is added to one entry, and the metadata of the content whose content ID is described in the operation information is acquired from the PC database 55 or the PD database 91 to be added to the one entry, so that the play history data of the PD is generated.

Figure 16:
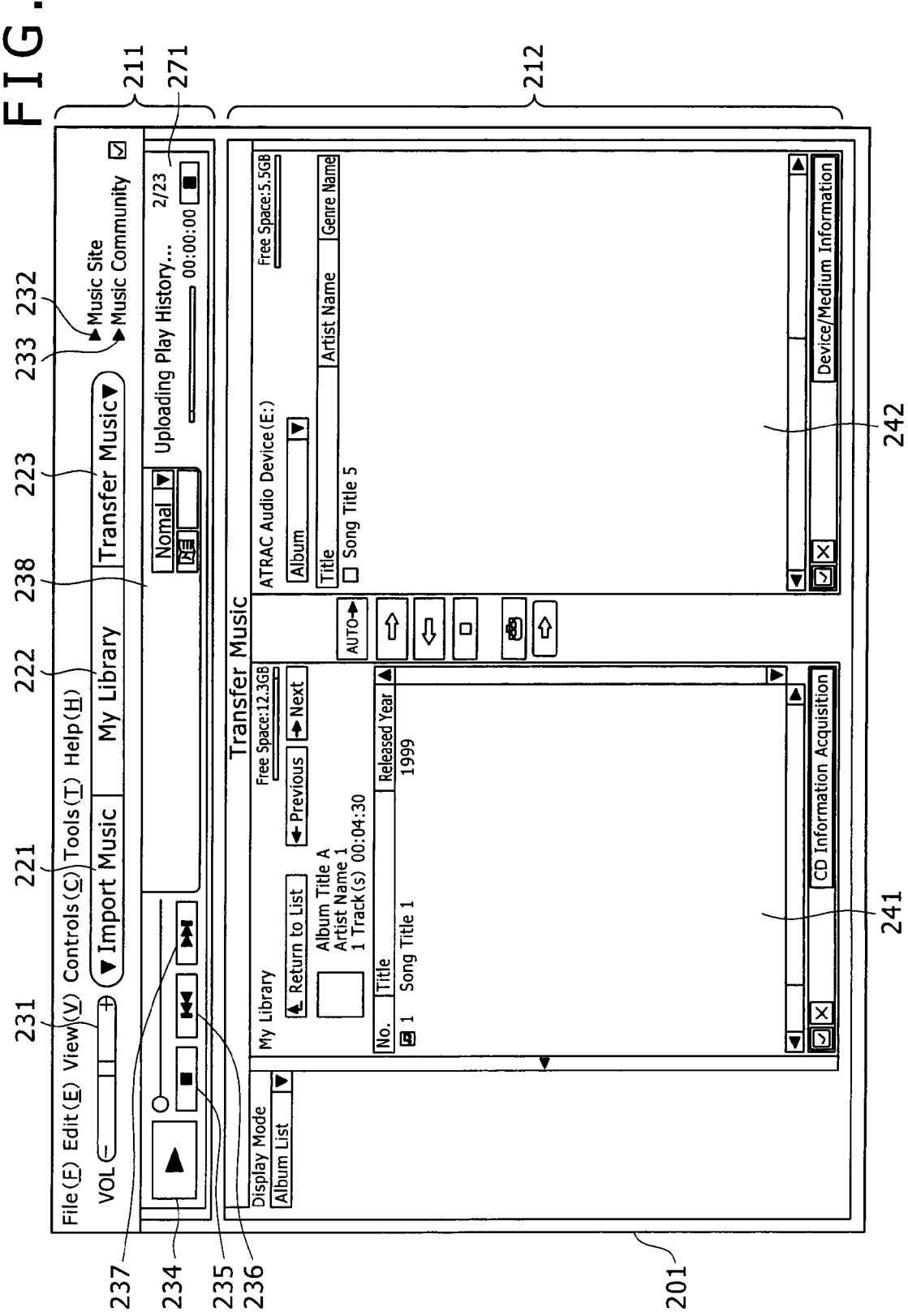
FIG. 16 shows an exemplary screen displayed on the display section.

Note that while the play history data of the PD is being generated, an indication 271 of progress of this process is displayed on the application screen 201, as shown in FIG. 16.

In the example of FIG. 16, to the right of the presentation section 238 within the basic feature display screen 211, a message "uploading play history . . . 2/23", a progress bar indicative of the progress of the process, and so on are displayed. Note that, actually, the message "uploading play history" and the progress bar indicate the progress from the start of the generation of the play history data up to the start of the transmission thereof to the server 3, during which a load is imposed on the CPU 11.

Returning to FIG. 12 again, the play history data of the PD generated at step S56 is supplied, together with the identification information of the PD, to the browser 52 via the communication data control section 73 and the communication control section 74.

At step S57, the browser 52 adds the identification information of the PD to a header of the play history data of the PD, and transmits them to the server 3 via the Java(registered trademark)Script interface and the network 2. Thereafter, at step S58, the application control section 72 determines whether the transmission has been successful.

Figure 19:
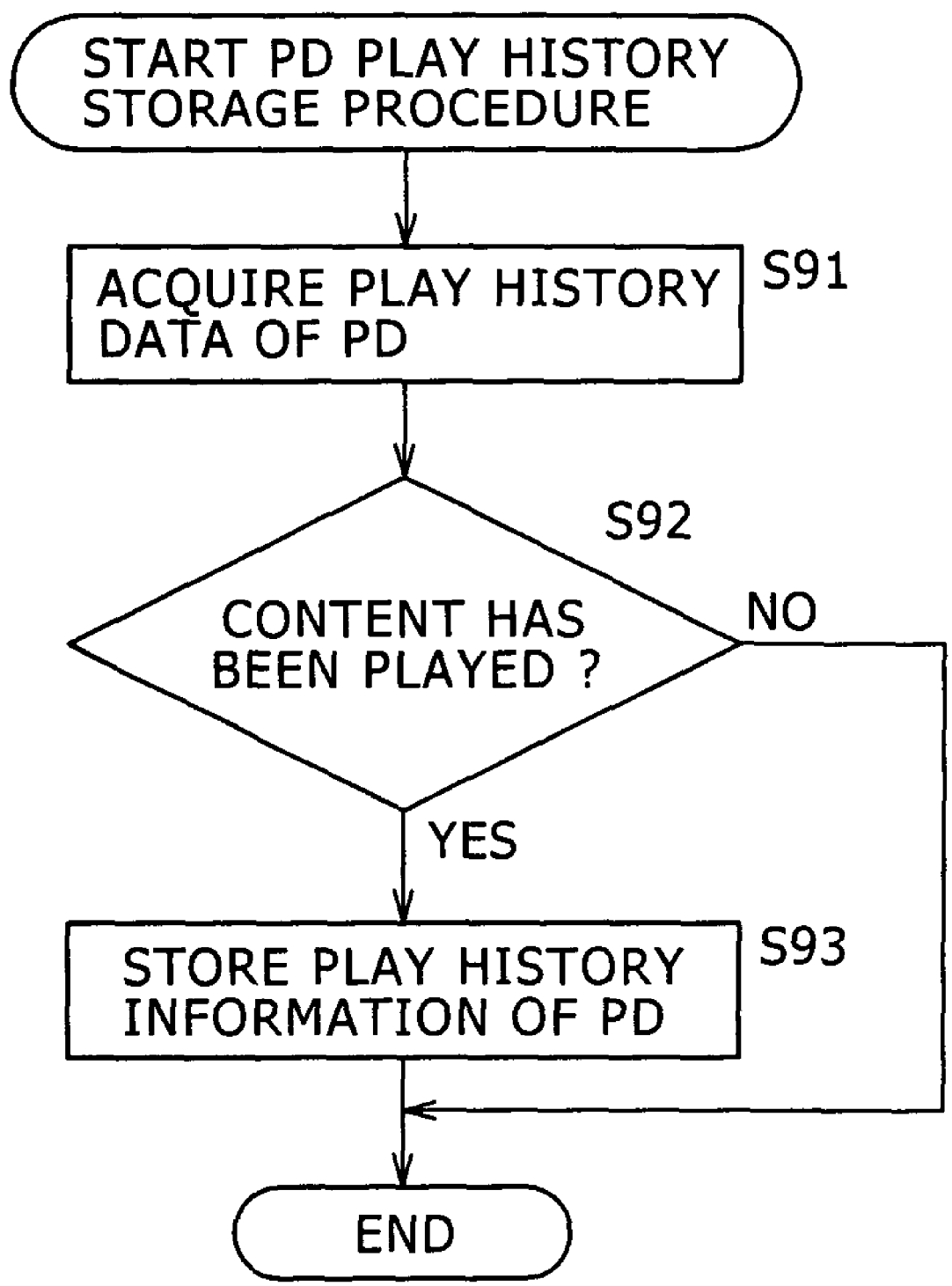
FIG. 19 is a flowchart illustrating a PD play history storage procedure performed by the server.

When the server 3 receives the play history data of the PD and the identification information of the PD at step S91 of FIG. 19 described later, the server 3 provides notification of the reception thereof via the network 2. The browser 52 supplies the notification of the reception by the server 3 to the application control section 72 via the communication control section 74 and the communication data control section 73.

When the notification of the reception from the server 3 is supplied from the communication data control section 73, the application control section 72, at step S58, determines that the transmission has been successful, and control proceeds to step S59. At step S59, the play history data generation section 76 discards the cache data stored at step S53, and finishes the PD play history transmission procedure.

If it is determined at step S58 that the transmission has not been successful, the PD play history transmission procedure is terminated with the process of step S59 skipped. That is, because the transmission to the server 3 has ended in failure, the cache data is retained, and when the PD 4 is connected to the PC 1 the next time, cache data of the operation information and identification information acquired the next time is added to the retained cache data, and the play history data of the PD is generated using the resultant cache data, and transmitted to the server 3.

If it is determined at step S52 that the notification of the play history should not be provided, the PD play history transmission procedure is terminated without the play history information of the PD being transmitted.

FIG. 17 shows an exemplary structure of the play history data of the PD generated by the process of step S56 in FIG. 12.

That is, in FIG. 17, the play history data of the PD as shown in FIG. 9 is shown in greater detail. The play history data of the PD is expressed in XML.

In the example of FIG. 17, <?xml version="1.0" encoding="UTF-8"?> in a first line represents that this play history data of the PD is expressed in version "1.0" of XML and encoded with "UTF-8".

An <entries> tag in a third line and an </entries> tag in an eleventh line represent that a plurality of pieces of play history data of the PD are described as entries in fourth to tenth lines. The fourth line, <entry xmlns="http://purl.org/atom/ns#" xmlns:otolog="http://otolog.org/ns/music#">, and an </entry> tag in the tenth line represent that the PD play history data of one content is described as one entry in the fifth to ninth lines. Note that characters that follow "entry" in the fourth line represent a URI for interpreting the XML.

Tags <otolog:artist> and </otolog:artist> in the fifth line are tags that indicate a name of an artist of the content of the one entry, and in the example of FIG. 17, the tags represent that the name of the artist of the content of the one entry is "Artist Name 1". Tags <otolog:album> and </otolog:album> in the sixth line are tags that indicate a name of an album of the content of the one entry, and in the example of FIG. 17, the tags represent that the name of the album of the content of the one entry is "Album Title 1". Tags <otolog:track> and </otolog:track> in the seventh line are tags that indicate a name of a track (title) of the content of the one entry, and in the example of FIG. 17, the tags represent that the name of the track of the content of the one entry is "Song Title 1".

Tags <otolog:duration> and </otolog:duration> in the eighth line are tags that represent the length of time, measured in seconds, for which the content of the one entry has been played. Tags <otolog:date> and </otolog:date> in the ninth line are tags that represent the playback start time of the content of the one entry in a "YYYY-MM-DD hh:mm:ss" format. "YYYY" represents the year in the Gregorian calendar, "MM" represents the month, "DD" represents the day, "hh" represents the hour, "mm" represents the minutes, and "ss" represents the seconds.

Note that, in the example of FIG. 17, the number of entries is only one, and the <entry> and </entry> tags are described for each entry.

Next, a procedure of generating the play history data of the PD as shown in FIG. 17 will now be described below with reference to a flowchart of FIG. 18. Note that the procedure of generating the play history data of the PD corresponds to the process of step S56 in FIG. 12, and the operation information and the identification information acquired from the PD 4 have already been stored as the cache data in the cache contained in the play history data generation section 76.

At step S71, the play history data generation section 76 generates the header of the play history data of the PD, i.e., <entries> as shown in FIG. 17.

At step S72, the play history data generation section 76 acquires, from the cache data, the content ID, the playback start time, and the playback stop time. That is, in the case of the example of FIG. 9, since the playback start time (11:30:10 on July 25, 2006) and the playback stop time (11:35:01 on July 25, 2006) of the content ID "010F500000040000007" are acquired, it is found that the playing time of the content ID "010F500000040000007" is four minutes and 51 seconds.

At step S73, the play history data generation section 76 generates an entry for the content ID "010F500000040000007", and adds the playback start time and the playing time obtained from the cache data (i.e., the operation information) to the entry. As a result, in the example of FIG. 17, "<otolog:duration> Length of Playing Time </otolog:duration>" in the eighth line and "<otolog:date> Playback Start Time </otolog:date>" in the ninth line are added to the entry.

At step S74, the play history data generation section 76 controls the content management section 77 to determine whether the content ID exists in the PC database 55. If it is determined at step S74 that the content ID exists in the PC database 55, the content management section 77, at step S75, controls the data access module 53 to acquire the metadata of the content having that content ID from the PC database 55, and supplies the acquired metadata to the play history data generation section 76.

In the case of the example of FIG. 9, for example, Song Title 1, Artist Name 1, and Album Title 1 of the content ID "010F500000040000007" are acquired from the PC database 55.

Meanwhile, in the case where the content having that content ID is, for example, a content that had been transferred from another source than the PC 1, e.g., another PC, that content ID does not exist in the PC database 55. In this case, it is determined at step S74 that that content ID does not exist in the PC database 55, and the play history data generation section 76, at step S76, controls the transfer processing section 78 to acquire, from the PD database 91 of the PD 4, the metadata of the content played with the PD 4.

In this case, the PD plug-in module 54 searches the additional information in the additional information table 103 corresponding to the song IDs in the basic group table 102 as shown in FIG. 6 in descending order of the song ID, for example, and when the content ID of the currently-searched song ID in the additional information table 103 corresponds with the desired content ID, the PD plug-in module 54 acquires the metadata (i.e., the song title, the artist name, and the album title) of that content ID from the additional information table 103.

Therefore, in the case where the metadata is acquired from the PD 4, it will take a long time to acquire the metadata when the desired content ID is not a content ID corresponding to a song ID listed near the top but a content ID corresponding to a song ID listed near the bottom. Therefore, the acquisition of the metadata from the PC database 55 is more efficient than the acquisition of the metadata from the PD.

Note that, because the file path is also stored in the additional information table 103, it is possible to access the content file using the file path to acquire the metadata directly from the content file.

At step S77, the play history data generation section 76 adds the acquired metadata to the entry. That is, the play history data generation section 76 further adds the metadata to the entry, to which the playback start time and the playing time obtained from the operation information have been added.

Specifically, the play history data generation section 76 adds, to the entry, Artist Name 1, Album Title 1, and Song Title 1, which are the metadata acquired from the PC database 55 or the additional information table 103 in the PD 4. As a result, as shown in FIG. 17, "<otolog:artist> Artist Name 1 </otolog:artist>" in the fifth line, "<otolog:album> Album Title 1 </otolog:album>" in the sixth line, and "<otolog:track> Song Title 1 </otolog:track>" in the seventh line are added to the entry for the content ID "010F500000040000007", to which "<otolog:duration> Length of Playing Time </otolog:duration>" in the eighth line and "<otolog:date> Playback Start Time </otolog:date> in the ninth line have already been added.

At step S78, the play history data generation section 76 determines whether a next content ID is present in the cache data. If it is determined at step 78 that there is the next content ID in the cache data, control returns to step S72, and the subsequent processes are repeated.

Meanwhile, if it is determined at step S78 that there is not the next content ID in the cache data, control proceeds to step S79, and the play history data generation section 76 generating a footer, and finishes the procedure of generating the play history data of the PD. That is, </entries> as shown in FIG. 17 is generated to complete the generation of the play history data of the PD.

As described above, the metadata of the content played with the PD 4 is acquired from the database in the PC 1 and added to the operation information to generate the play history data of the PD. Therefore, the play history data of the PD can be generated faster than in the case where the metadata is acquired from the PD 4. Moreover, because the database in the PC 1 is capable of storing a greater amount of metadata than the PD 4, it is possible to transmit other metadata than the above-described artist, album, and song title to the server 3 to be stored therein together with the play history, resulting in improved extensibility of the service provided to the user.

Next, with reference to a flowchart of FIG. 19, a PD play history storage procedure performed by the server 3 in conjunction with the procedure of FIG. 12 will now be described below.

At step S57 in FIG. 12 described above, the PC 1 transmits the play history data of the PD and the identification information of the PD to the server 3 via the network 2.

At step S91, the PD play history acquisition section 113 of the server 3 acquires the play history data of the PD and the identification information of the PD via the network 2, and supplies the acquired play history data of the PD and identification information of the PD to the PD play determination section 114. At this time, the PD play history acquisition section 113 notifies the PC 1 via the network 2 that the play history data of the PD has been received.

At step S92, the PD play determination section 114 uses the play history data of the PD to determine whether the content has been played. For example, in a manner similar to that described above with reference to FIG. 10, an entire playing time T2 of the content indicated by each entry of the play history data of the PD is obtained from the metadata DB (not shown) contained in the server 3. Accordingly, the PD play determination section 114 compares a playing time T1 of the content indicated by each entry in the play history data of the PD with the entire playing time T2 of the content, and when the playing time T1 of the content is more than half the entire playing time T2 (i.e., T1>T2/2), for example, the PD play determination section 114 determines at step S92 that the content has been played, and control proceeds to step S93.

At step S93, the PD play determination section 114 stores, as the play history information of the PD, the metadata, the playback start time, the playing time, etc., of the content that has been determined to have been played in the PD play history database 122 together with the identification information. Note that the metadata, the playback start time, the playing time, etc., of the content are obtained from the play history data of the PD.

Meanwhile, if it is determined at step S92 that the content has not been played, the PD play history storage procedure is terminated without the play history information of the PD being stored.

The play history information of the PD stored in the above-described manner is disclosed by the Web service of the server 3 to the user himself or herself or other people, or used thereby to generate the ranking information or the like to be disclosed.

FIG. 20 shows an exemplary screen in which the play history information of the PD stored in the server 3 is presented together with the play history information of the PC. In the example of FIG. 20, parts having corresponding parts in FIG. 13 are assigned the same reference numerals as in FIG. 13, and explanation thereof is omitted to avoid redundancy.

In the optional display screen 212 of the application screen 201 as shown in FIG. 20, the Web service screen from the server 3 for providing the Web service (i.e., the music community) is being displayed as a screen corresponding to the "Import Music" button 221 as a result of the user selecting the music community button 233 on the basic feature display screen 211.

On the Web service screen, a PC play history display section 281 and a PD play history display section 282 are arranged. The PC play history display section 281 is used to present, to the user of the PC 1 or other users, information of ten songs that have recently been played the most frequently with the PC 1 (hereinafter also referred to as "PC playlog 10 newest songs"), the information being generated by the server 3 based on the play history information of the PC of the user of the PC 1. The PD play history display section 282 is used to present, to the user of the PC 1 and other users, information of ten songs that have recently been played the most frequently with the PD 4 (hereinafter also referred to as "PD playlog 10 newest songs"), the information being generated by the server 3 based on the play history information of the PD of the user of the PC 1. In addition, a scroll bar 283 for scrolling the optional display screen 212 in a horizontal direction is arranged at the bottom of the optional display screen 212, whereas a scroll bar 284 for scrolling the optional display screen 212 in a vertical direction is arranged on the right-hand side of the optional display screen 212.

In the example of FIG. 20, display space is so limited that eight songs are displayed in the PC play history display section 281 and the PD play history display section 282.

In the PC play history display section 281, for example, information (i.e., the song titles and the artist names) of eight songs is displayed as the information of the songs that have been played the most frequently with the PC 1. Specifically, as information of a song that has been listened to the most frequently, "Song Title A" and "Artist Name 19" are displayed. As information of a song that has been listened to the second most frequently, "Song Title P" and "Artist Name 38" are displayed. As information of a song that has been listened to the third most frequently, "Song Title W" and "Artist Name 2" are displayed. As information of a song that has been listened to the fourth most frequently, "Song Title Q" and "Artist Name 51" are displayed.

As information of a song that has been listened to the fifth most frequently, "Song Title B" and "Artist Name 8" are displayed. As information of a song that has been listened to the sixth most frequently, "Song Title E" and "Artist Name 13" are displayed. As information of a song that has been listened to the seventh most frequently, "Song Title M" and "Artist Name 2" are displayed. As information of a song that has been listened to the eighth most frequently, "Song Title H" and "Artist Name 1" are displayed.

On the other hand, in the PD play history display section 282, information (i.e., the song titles and the artist names) of eight songs is displayed as the information of the songs that have been played the most frequently with the PD 4. Specifically, as information of a song that has been listened to the most frequently, "Song Title W" and "Artist Name 2" are displayed. As information of a song that has been listened to the second most frequently, "Song Title P" and "Artist Name 38" are displayed. As information of a song that has been listened to the third most frequently, "Song Title A" and "Artist Name 19" are displayed. As information of a song that has been listened to the fourth most frequently, "Song Title M" and "Artist Name 2" are displayed.

As information of a song that has been listened to the fifth most frequently, "Song Title E" and "Artist Name 13" are displayed. As information of a song that has been listened to the sixth most frequently, "Song Title C" and "Artist Name 5" are displayed. As information of a song that has been listened to the seventh most frequently, "Song Title R" and "Artist Name 19" are displayed. As information of a song that has been listened to the eighth most frequently, "Song Title H" and "Artist Name 1" are displayed.

As described above, the Web service displays (i.e., presents) not only the play history information of the PC but also the play history information of the PD. Therefore, the user himself or herself of the PC or other users are able to obtain, via the Web service, not only the history information of songs that the user of the PC has listened to using the application on the PC but also the history information of songs that the user has listened to using the PD. Therefore, the user himself or herself and the other users are able to obtain not only the information of the songs that have recently been listened to frequently with the PC 1 but also the information of the songs that have recently been listened to frequently with the PD 4.

Note that, in the example of FIG. 20, the number of PD play history display sections 282 being displayed is one. However, in the case where the user uses a plurality of PDs (e.g., two PDs), a plurality of PD play history display sections 282 (e.g., two play history display sections 282) are provided, each for a separate piece of identification information of the PD. As a result, the user himself or herself and the other users are able to obtain the information of the songs that have recently been listened to frequently, while differentiation is made not only between the PC and the PD but also between different PDs.

Because not only the play history information of the PC but also the play history information of the PD is transmitted to the server (i.e., the Web service) as described above, unified management of the play history information is achieved by the server, and since a use case of the user is expanded, sources from which the play history information is acquired increase in variety, and thus an increased amount of play history information can be accumulated in the server. As a result, the accumulated play history information can be used as resources for providing a new service.

Specifically, for example, it is possible to collect statistics about contents that have been listened to in Japan in the first half of 2006 using the increased amount of play history information, and create a playlist of a ranking, such as a top 100 ranking. It is also possible to collect statistics about contents that have been listened to frequently on rainy days, and create a playlist of contents suitable for rainy days or the like. Such created playlists can be provided to the PC or the PD as feedback. Because such playlists are created using the increased amount of play history information, they may be data with a high degree of versatility. This in turn attracts more users who desire such playlists to this Web server, and accordingly, a still greater amount of play history information can be accumulated. This raises expectations of providing an additional new service.

In addition, because the play history information of the PD is managed together with the identification information, it is possible to manage the play history information on a model-by-model basis, in the case where the user uses a plurality of PDs or both the PD and the mobile phone, for example.

In addition, because the metadata managed in the PC is added to the operation information concerning the playing with the PD, and the resultant data is transmitted to the server as the play history data, the data can be generated more efficiently than in the case where the metadata is acquired from the PD. Further, because the PC is able to manage more detailed metadata, such as lyrics information, the jacket image, etc., the play history data having such detailed metadata added thereto can be transmitted to the server. In this case, more detailed play history information can be managed in the server.

Note that in the foregoing description, there has been described an exemplary case where the operation information (i.e., the play history) concerning the playing stored in the PD is transmitted (i.e., uploaded) to the server. However, the information transmitted from the PD to the server is not limited to the operation information. Other information stored in the PD may be transmitted to the server, alternatively.

For example, it is possible to upload a playlist edited in the PD to the server 3. It is also possible to upload an image associated by the user with the content (e.g., an image photographed during a journey associated with a content which the user has listened to frequently during the journey) to the server 3.

Note that in the foregoing description, the music contents have been used as an example of the contents. However, the present invention can be applied not only to the music contents but also to other types of contents, such as a moving image, a still image, an application, etc.

Also note that, in the foregoing description, the personal computer such as the PC 1 as shown in FIG. 2 has been used as an example of an information processing apparatus. However, the use of the PC 1 as the information processing apparatus is not essential to the present invention. For example, the PD 4, which is a portable recording/playback device, the mobile phone, other personal digital assistant (PDA) devices, a playback device such as an audiovisual (AV) device, a consumer electronics (CE) device such as a recording/playback device or a household electrical appliance, or the like may be used as the information processing apparatus.

The above-described series of processes may be implemented in either hardware or software.

In the case where the series of processes is implemented in software, a program that constitutes the software is installed from a network or a storage medium into a computer having a dedicated hardware configuration or, for example, a general-purpose personal computer that, when various programs are installed therein, becomes capable of performing various functions.

As shown in FIG. 2, this storage medium may be formed by a packaged medium having the program stored therein, such as the removable medium 22, which is delivered separately from a body of the device for providing the program to the user. Examples of the removable medium 22 include a magnetic disk (including a flexible disk), an optical disk (including a compact disk-read only memory (CD-ROM) and a digital versatile disk (DVD)), a magneto-optical disk (including an MD (Mini-Disk)(trademark)), and a semiconductor memory. The storage medium may also be formed by the ROM 12 or the hard disk contained in the storage section 19, which has the program stored therein and is contained in the body of the device and thus provided to the user.

Note that the steps shown in the flowcharts in the present specification may naturally be performed chronologically in order of description but need not be performed chronologically. Some steps may be performed in parallel or independently of one another.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that transmits information to a server, the apparatus comprising:

connection determination means for determining whether a portable terminal has been connected to the information processing apparatus;

information acquisition means for, when said connection determination means determines that the terminal has been connected to the information processing apparatus, acquiring, from the terminal, identification information of the terminal and operation information concerning playing of a content played by the terminal, the operation information including a start time and a stop time of the playing of the content played by the terminal;

storage means for storing metadata of a content;

metadata determination means for determining whether metadata of the content played by the terminal is stored in said storage means;

play history information generation means for adding metadata to the operation information acquired by said information acquisition means;

metadata acquisition means for acquiring metadata; and transmission means for transmitting, to the server, play history information of the terminal together with the identification information of the terminal, the play history information of the terminal being composed of the operation information acquired by said information acquisition means, wherein, after said metadata determination means determines that the metadata of the content played by the terminal is stored in said storage means, said metadata acquisition means acquires the metadata of the content played by the terminal from said storage means, and said play history information generation means adds the metadata acquired by said metadata acquisition means to the operation information acquired by said information acquisition means to generate the play history information of the terminal, and after said metadata determination means determines that the metadata of the content played by the terminal is not stored in said storage means, said information acquisition means further acquires, from the terminal, the metadata of the content played by the terminal, and said play history information generation means adds the metadata acquired by said information acquisition means to the operation information acquired by said information acquisition means to generate the play history information of the terminal.

2. An information processing method employed by an information processing apparatus that transmits information to a server, the method comprising the steps of:

determining whether a portable terminal has been connected to the information processing apparatus;

when it is determined that the terminal has been connected to the information processing apparatus, acquiring, from the terminal, identification information of the terminal and operation information concerning playing of a content played by the terminal, the operation information including a start time and a stop time of the playing of the content played by the terminal;

storing metadata of a content in a storage section;

determining, after it is determined that the terminal has been connected to the information processing apparatus, whether metadata of the content played by the terminal is stored in said storage section;

acquiring, after it is determined that the metadata of the content played by the terminal is stored in said storage section, the metadata of the content played by the terminal from said storage section, and adding the metadata of the content played by the terminal, and acquired from said storage section, to the operation information acquired from the terminal to generate play history information of the terminal;

acquiring from the terminal, after it is determined that the metadata of the content played by the terminal is not stored in said storage section, the metadata of the content played by the terminal, and adding the metadata of the content played by the terminal, and acquired from the terminal, to the operation information acquired from the terminal to generate play history information of the terminal; and transmitting, to the server, play history information of the terminal together with the identification information of the terminal, the play history information of the terminal being composed of the acquired operation information and the acquired metadata.

3. A computer readable storage medium encoded with computer executable instructions which, when executed by a computer, cause the computer to execute a method comprising the steps of:

determining whether a portable terminal has been connected;

when it is determined that the terminal has been connected, acquiring, from the terminal, identification information of the terminal and operation information concerning playing of a content played by the terminal, the operation information including a start time and a stop time of the playing of the content played by the terminal;

storing metadata of a content in a storage section;

determining, after it is determined that the terminal has been connected, whether metadata of the content played by the terminal is stored in said storage section;

acquiring, after it is determined that the metadata of the content played by the terminal is stored in said storage section, the metadata of the content played by the terminal from said storage section, and adding the metadata of the content played by the terminal, and acquired from said storage section, to the operation information acquired from the terminal to generate play history information of the terminal;

acquiring from the terminal, after it is determined that the metadata of the content played by the terminal is not stored in said storage section, the metadata of the content played by the terminal, and adding the metadata of the content played by the terminal, and acquired from the terminal, to the operation information acquired from the terminal to generate play history information of the terminal; and transmitting, to the server, play history information of the terminal together with the identification information of the terminal, the play history information of the terminal being composed of the acquired operation information and the acquired metadata.

4. An information processing apparatus that transmits information to a server, the apparatus comprising:

a connection determination section configured to determine whether a portable terminal has been connected to the information processing apparatus;

an information acquisition section configured to, when said connection determination section determines that the terminal has been connected to the information processing apparatus, acquire, from the terminal, identification information of the terminal and operation information concerning playing of a content played by the terminal, the operation information including a start time and a stop time of the playing of the content played by the terminal;

a storage section configured to store metadata of a content;

a metadata determination section configured to determine whether metadata of the content played by the terminal is stored in said storage section;

a play history information generation section configured to add metadata to the operation information acquired by said information acquisition section;

a metadata acquisition section configured to acquire metadata; and a transmission section configured to transmit, to the server, play history information of the terminal together with the identification information of the terminal, the play history information of the terminal being composed of the operation information acquired by said information acquisition section, wherein, after said metadata determination section determines that the metadata of the content played by the terminal is stored in said storage section, said metadata acquisition section acquires the metadata of the content played by the terminal from said storage section, and said play history information generation section adds the metadata acquired by said metadata acquisition section to the operation information acquired by said information acquisition section to generate the play history information of the terminal, and after said metadata determination section determines that the metadata of the content played by the terminal is not stored in said storage section, said information acquisition section further acquires, from the terminal, the metadata of the content played by the terminal, and said play history information generation section adds the metadata acquired by said information acquisition section to the operation information acquired by said information acquisition section to generate the play history information of the terminal.

5. The information processing apparatus according to claim 1, wherein the play history information of the terminal further includes a play time duration based on the start time and the stop time of the operation information.

6. The information processing apparatus according to claim 1, wherein the play history information of the terminal is transmitted together with the identification information of the terminal such that the play history information is linked to the identification information of the terminal.

7. The information processing method according to claim 2, wherein the play history information of the terminal further includes a play time duration based on the start time and the stop time of the operation information.

8. The information processing method according to claim 2, wherein the play history information of the terminal is transmitted together with the identification information of the terminal such that the play history information is linked to the identification information of the terminal.

9. The computer readable storage medium according to claim 3, wherein the play history information of the terminal further includes a play time duration based on the start time and the stop time of the operation information.

10. The computer readable storage medium according to claim 3, wherein the play history information of the terminal is transmitted together with the identification information of the terminal such that the play history information is linked to the identification information of the terminal.

11. The information processing apparatus according to claim 4, wherein the play history information of the terminal further includes a play time duration based on the start time and the stop time of the operation information.

12. The information processing apparatus according to claim 4, wherein the play history information of the terminal is transmitted together with the identification information of the terminal such that the play history information is linked to the identification information of the terminal.

* * * * *